United States Patent [19]

Funabashi et al.

[11] Patent Number: 5,330,949
[45] Date of Patent: Jul. 19, 1994

[54] METHOD FOR PRODUCING POLYOLEFIN

[75] Inventors: Hideo Funabashi; Akira Tanaka; Rikuo Ohnishi; Toshikazu Kasahara; Takashi Yamawaki, all of Ichihara, Japan

[73] Assignee: Idemitsu Petrochemical Company, Ltd., Tokyo, Japan

[21] Appl. No.: 515,782

[22] Filed: Apr. 26, 1990

Related U.S. Application Data

[63] Continuation of Ser. No. 279,260, Dec. 1, 1988, abandoned, which is a continuation of Ser. No. 871,221, Jun. 6, 1986, abandoned.

[30] Foreign Application Priority Data

| | | | |
|---|---|---|---|
| Jun. 17, 1985 | [JP] | Japan | 60-131307 |
| Jun. 18, 1985 | [JP] | Japan | 60-132578 |
| Nov. 20, 1985 | [JP] | Japan | 60-260370 |
| Nov. 22, 1985 | [JP] | Japan | 60-263177 |
| Nov. 26, 1985 | [JP] | Japan | 60-265266 |
| Dec. 17, 1985 | [JP] | Japan | 60-284099 |
| Dec. 21, 1985 | [JP] | Japan | 60-288697 |
| Dec. 30, 1985 | [JP] | Japan | 60-298332 |
| Dec. 30, 1985 | [JP] | Japan | 60-298333 |
| Jan. 28, 1986 | [JP] | Japan | 61-16328 |
| Feb. 28, 1986 | [JP] | Japan | 61-43669 |
| Feb. 28, 1986 | [JP] | Japan | 61-43670 |

[51] Int. Cl.$^5$ .................. C08F 4/654; C08F 4/656; C08F 10/00

[52] U.S. Cl. .................. 502/111; 502/156; 502/242; 502/251; 502/263; 502/439; 502/120; 502/125; 526/97; 526/124; 526/351; 526/348; 526/348.6; 525/268

[58] Field of Search .............. 502/104, 111, 156, 242, 502/251, 263, 439

[56] References Cited

U.S. PATENT DOCUMENTS

| | | | |
|---|---|---|---|
| 4,258,159 | 3/1981 | Bienfoit | 526/124 |
| 4,309,521 | 1/1982 | Sato et al. | 526/119 |
| 4,374,753 | 2/1983 | Pullukat et al. | 526/129 |
| 4,565,795 | 1/1986 | Short et al. | 526/128 |
| 4,565,798 | 1/1986 | Yamamoto et al. | 526/124 |
| 4,634,746 | 1/1987 | Etherton et al. | 526/124 |
| 4,849,483 | 7/1989 | Tachikawa et al. | 526/124 |

FOREIGN PATENT DOCUMENTS

| | | |
|---|---|---|
| 45977 | 2/1982 | European Pat. Off. ........... 526/124 |
| 2847758 | 5/1980 | Fed. Rep. of Germany . |
| 58-162607 | 9/1983 | Japan . |

OTHER PUBLICATIONS

Patents Abstracts of Japan, vol. 7, No. 285 (C-201) [1430], Dec. 20, 1983; & JP-A-58 162 607 (Mitsui Toatsu Kagaku K.K.) Sep. 27, 1983.

Patents Abstracts of Japan, vol. 9, No. 36 (C-266) [1759], Feb. 15, 1985; & JP-A-59 179 607 (Idemitsu Kosan K. K.) Oct. 12, 1984.

*Primary Examiner*—Edward J. Smith
*Attorney, Agent, or Firm*—Nikaido, Marmelstein, Murray & Oram

[57] ABSTRACT

A method for producing a polyolefin is disclosed which comprises polymerizing an α-olefin in the presence of a catalyst composition comprising (A) a solid catalyst component prepared by contacting (a) a solid component comprising a magnesium alkoxide and/or a magnesium salt of a fatty acid supported on an inorganic oxide composed of at least one member selected from the group consisting of oxides of elements belonging to Groups II, III and IV of the periodic table and/or a composite inorganic oxide containing at least one member selected from the group consisting of oxides of elements belonging to Groups II, III and IV of the periodic table, the inorganic oxide or composite inorganic oxide having a surface hydroxide concentration of 3 μmol/m$^2$ or less, (b) an electron donating compound and (c) a titanium halide, (B) an organic metal compound, and (C) an electron donating compound.

According to the method, a step of removing the catalyst residue from the polypropylene produced can be eliminated and the products have well balanced mechanical strength such as stiffness and impact strength.

2 Claims, No Drawings

METHOD FOR PRODUCING POLYOLEFIN

This application is a continuation of application Ser. No. 279,260 filed Dec. 1, 1988 which is a continuation of application Ser. No. 871,221 filed Jun. 6, 1986, both now abandoned.

FIELD OF THE INVENTION

The present invention relates to a method for producing a polyolefin.

BACKGROUND OF THE INVENTION

It is known to produce a polyolefin using a Ziegler Natta catalyst comprising a solid catalyst component composed of a titanium component and a magnesium halide carrier, and an organic aluminum compound component as described in JP-A-39991/78, JP-A-206415/84, etc.

This conventional catalyst has a relative high activity. However, there is a problem that when the polyolefin produced by the above-described conventional method is molded using a molding machine, magnesium halide which remains in the polyolefin produced promotes corrosion of the molding machine and leads to production of molded articles having a poor appearance.

On the other hand, a method for producing a polyolefin has been proposed which uses a solid catalyst component prepared by supporting a magnesium dialkoxide on a carrier of an inorganic oxide such as $SiO_2$ not containing a halogen and reacting the thus-prepared solid catalyst component with an electron donating compound such as a carboxylic acid monoester and a titanium halide compound, as described in JP-A-162607/83.

However, this method is disadvantageous in that the catalyst used has a low catalytic activity and the deposition of the magnesium alkoxide on the carrier is insufficient, resulting in that the polyolefin obtained is powder of poor particle size distribution and has an insufficient stereoregularity, and that depending on the kind of the α-olefin used the molecular weight distribution of the resulting polyolefin is broad and films molded therefrom have a poor transparency.

Further, a method for producing a polyolefin using a solid catalyst composed of a titanium halide and a carrier which is prepared by reacting an organic silicon compound with silica, for example, and further reacting the product with a magnesium compound such as a magnesium alkyl halide compound (RMgX) and with an alcohol, sequentially, as described in Japanese Patent Publication No. 6962/85.

This conventional method, however, is disadvantageous in that polymers having a high stereoregularity are not obtained.

On the other hand, it is known to produce a polypropylene, one of polyolefins, using a multi-stage polymerization method in order to improve the impact strength of the polypropylene.

For example, there is known a two-stage slurry polymerization method as described in , e.g., Japanese Patent Publication No. 11448/83. The polypropylene produced by this method has an impact strength which is improved to some extent but is insufficiently satisfactory.

A three-stage slurry polymerization method is also proposed as described in Japanese Patent Publication No. 145114/82, which method fails to produce polypropylenes that have a satisfactorily improved impact strength.

In addition, a two-stage gas phase polymerization method using a titanium trichloride catalyst is proposed as described in, e.g., JP-A-187 413. Although this method is somewhat improved since it does not require a step of recovering the solvent used and thus a step of drying the resulting polymer is widely simplified, it still needs to remove catalyst residue because the catalyst used has a low catalytic activity. In order to cope with this problem, development of a gas phase polymerization method using a catalyst having a high catalytic activity is under way but there are many problems to be solved before such method can be utilized in practice and a complete solution therefore has not been proposed yet as far as is known.

Among polyolefins, there is included propylene ethylene random copolymers, which are used widely in various fields of film technology. The propylene-ethylene random copolymers are produced by copolymerizing propylene and ethylene monomers using a stereoregular polymerization catalyst comprising a solid catalyst component composed of a titanium compound supported on a magnesium halide carrier, and an organic aluminum compound.

However, such propylene-ethylene random copolymers are disadvantageous in that they have poor heat sealing properties at low temperatures.

In order to improve the heat sealing properties of propylene-ethylene random copolymers, it has conventionally been proposed to increase the content of ethylene as a monomer unit.

When a slurry polymerization method is employed in order to increase the content of ethylene, not only the amount of soluble polymers which are by-produced increases and as a result the yield of the propylene-ethylene random copolymer desired decreases but also the properties of the slurry during the polymerization reaction is deteriorated and it is difficult to carry out the polymerization reaction continuously.

On the other hand, an attempt to increase the content of ethylene by the use of a gas phase polymerization method gives rise to a new problem in that the resulting propylene-ethylene random copolymer has an increased adherent property which tends to lead to the formation of agglomerates and as a result to the occurrence of accidents such as clogging of pipelines for transportation and the like.

Further, the various polyolefins produced by the above-described polymerization methods, which are usually transported in a pipeline to a predetermined place in the form of dry powders, tend to cause accidents due to clogging of pipelines for transportation since the polyolefins produced by the conventional methods have unsatisfactory particle size distribution.

SUMMARY OF THE INVENTION

An object of the present invention is to provide a method for producing a polyolefin having a good particle size distribution which can be passed through a pipeline for transportation without causing clogging thereof.

Another object of the present invention is to provide a method for producing a polyolefin which contains much less catalyst residue and is prevented from corroding molding machines, and in addition which can be molded into articles having a good appearance.

Still another object of the present invention is to provide a method for producing a polyolefin which has a high stereoregularity and can be molded into highly transparent films.

Further, an object of the present invention is to provide a method for producing a polyolefin which can be molded into articles having an improved mechanical strength.

A still further object of the present invention is to provide a method for producing a polyolefin, particularly a propylene copolymer, which can be molded into articles having improved heat sealing properties at low temperatures.

Another object of the present invention is to provide a method for producing a polyolefin, particularly a polybuten-1, which contains catalyst residues in minimized amounts, has a high stereoregularity, has a narrow particle size distribution and contains substantially no fine powder.

Still another object of the present invention is to provide a carrier for a catalyst which has a high activity and is suitable for use in the polymerization of polyolefins which contains a reduced amount of a catalyst residue, and a method for producing such a carrier.

Yet another object of the present invention is to provide a carrier for a catalyst with which there can be produced a polyolefin having a good practice size distribution and which not only does not harm but also increases the catalytic activity of titanium, and a method for producing such a carrier.

These objects of the present invention are attained by polymerizing an α-olefin in the presence of a catalyst composition comprising (A) a solid catalyst component prepared by contacting (a) a solid component comprising a magnesium alkoxide and/or a magnesium salt of a fatty acid supported on an inorganic oxide composed of at least one member selected from the group consisting of oxides of elements belonging to Groups II, III and IV of the periodic table and/or a composite inorganic oxide containing at least one member selected from the group consisting of oxides of elements belonging to Groups II, III and IV of the periodic table, the inorganic oxide or composite inorganic oxide having a surface hydroxyl group concentration of 3 $\mu$mol/m$^2$ or less, (b) an electron donating compound and (c) a titanium halide, (B) an organic metal compound, particularly an organic aluminium compound, and (C) an electron donating compound.

Further, the above-described objects of the present invention are attained by the use of, as a catalyst, a carrier having supported thereon a magnesium alkoxide and/or a magnesium salt of a fatty acid, which is prepared by mixing an inorganic oxide composed of at least one member selected from the group consisting of oxides of elements belonging to Groups II, III and IV of the periodic table and/or a composite inorganic oxide containing at least one member selected from the group consisting of oxides of elements belonging to Groups II, III and IV of the periodic table, the inorganic oxide or composite inorganic oxide having a surface hydroxyl group concentration of 3 $\mu$mol/m$^2$ or lest;, or the inorganic oxide and/or composite inorganic oxide pretreated with a silicon halide and with an alcohol in this order or pretreated with a specified organic silane compound, the pretreated inorganic oxide or composite inorganic oxide having a surface hydroxy group concentration of 3 $\mu$mol/m$^2$ or less, with a mixture containing at least one member selected from the group consisting of a hydrocarbon, an electron donating compound and an alkoxytitanium, and a magnesium alkoxide and/or a magnesium salt of a fatty acid, optionally adding a depositing agent, separating a solid component from the resulting mixture, and drying the solid component.

DETAILED DESCRIPTION OF THE INVENTION

1. Catalyst

In the method for producing a polyolefin according to the present invention, it is essential to use a catalyst composition comprising (A) a solid catalyst component prepared by contacting (a) a solid component comprising a magnesium alkoxide and/or a magnesium salt of a fatty acid supported on an inorganic oxide composed of at least one member selected from the group consisting of oxides of elements belonging to Groups II, III and IV of the periodic table and/or a composite inorganic oxide containing at least one member selected from the group consisting of oxides of elements belonging to Groups II, III and IV of the periodic table, the inorganic oxide or composite inorganic oxide having a surface oxide or composite inorganic oxide having a surface hydroxyl group concentration of 3 $\mu$ mol/m$^2$ or less, (b) an electron donating compound and (c) a titanium halide, (B) an organic metal compound, particularly an organic aluminium compound, and (C) an electron donating compound.

1-(A) Solid Catalyst Component (A)

The above-described solid catalyst component (A) can be obtained by contacting (a) a specified inorganic oxide and/or composite inorganic oxide containing at least one such inorganic oxide which has a surface hydroxyl group concentration of 3 $\mu$mol/m$^2$ or less (hereafter sometimes referred to as "an inorganic oxide component") having supported thereon a magnesium alkoxide and/or a magnesium salt of a fatty acid, (b) an electron donating compound, and (c) a titanium halide compound, if desired in (d) a solvent.

1-(A)-(a) Solid Component (a)

1-(A)-(a)-i Inorganic Oxide Component

The above-described specified oxide includes oxides of elements belonging to Group II, III or IV of the periodic table and specific examples thereof include MgO, CaO, B$_2$O$_3$, SiO$_2$, SnO$_2$, Al$_2$O$_3$, etc.

The composite inorganic oxide is an oxide containing at least one member selected from the group consisting of oxides of elements belonging to Group II, III or IV of the periodic table. Specific examples thereof include SiO$_2$—Al$_2$O$_3$, SiO$_2$—MgO, SiO$_2$—TiO$_2$, SiO$_2$—V$_2$O$_5$, SiO$_2$—Cr$_2$O$_2$, SiO$_2$—TiO$_2$—MgO, etc.

These inorganic oxides and composite inorganic oxides can be used singly or in combination. More particularly, two or more of the inorganic oxides can be used simultaneously. Further, two or more of the composite inorganic oxides can be used simultaneously. In addition, the inorganic oxide and the composite inorganic oxide can be used together.

Since it serves as a carrier for a catalyst, the inorganic oxide component must have characteristics suitable as a carrier, and it is preferred that the inorganic oxide component have a specific surface area (BET) of 10 to 800 m$^2$/g, an average pore diameter of 10 A or more and an average particle size of 0.1 to 1000 $\mu$m.

Among the above-described inorganic oxide components, SiO$_2$ and Al$_2$O$_3$, which can have the abovedescribed characteristics, are preferred.

Further, in the present invention, it is preferred that the above-described inorganic oxide component have a surface hydroxyl group concentration of 3 µ mol/m² or less, more preferably 1 to 0,005 µ mol/m since the possibility of decrease in the polymerization activity per titanium atom of the resulting catalyst composition increases when the surface hydroxyl group concentration of the inorganic oxide component exceeds 3 µ mol/m².

1-(A)-(a)-2 Pretreatment of Inorganic Oxide Component

In order to lower the concentration of the hydroxyl group on the surface of the inorganic oxide component to a level of 3 µ mol/m² or less, it is preferred to perform the following pretreatments.

a) First method: After dehydration, the above described inorganic component is incinerated at a temperature of 600 ° C. or more for 1 hour or more, followed by discharging the incinerating atmosphere.

b) Second method: The above-described inorganic oxide component is contacted with an alcohol.

c) Third method: The above-described inorganic oxide is contacted with a silicon halide and with an alcohol sequentially in this order.

d) Fourth method: The above-described inorganic component is contacted with a specified organic silicon.

In the present invention, it is preferred to carry out the first method, and one of the second, third and fourth methods in combination.

1-(A)-(a)-2-1 Silicon Halide

As for the silicon halide, the following compounds can be used.

$(Si)_n(H)_m(X)_l$ or $(Si)_o(R)_p(X)_q$ where l, m, n, o, p and q each represent a positive number provided that $m+l=2n+2$, and $p+q=2o+2$, R represents an alkyl group or an alkenyl group, and X represents a fluorine atom, a chlorine atom, a bromine atom or an iodine atom.

Suitable examples of the silicon halide include silicon chlorides such as $SiCl_4$, $Si_2Cl_6$, $Si_3Cl_8$, $Si_4Cl_{10}$, $SiHCl_3$, $CH_3SiCl_2$, $(CH_3)_3SiCl$, $(CH_3)_3SiCl$, $C_2H_5SiCl_3$, $(C_2H_5)_2SiCl_2$, $(C_2H_5)_3SiCl$, etc., silicon fluorides, bromides and iodide which are obtained by substituting the chlorine atom(s) in the silicon chlorides by fluorine atom(s), bromine atom(s) or iodine atom(s). Of these, the silicon chlorides are preferred, with $SiCl_4$, $CH_3SiCl_3$, $(CH_3)_2SiCl_2$ and $(CH_3)_3SiCl$ being particularly preferred.

The silicon halide which is contacted with the above inorganic oxide component can be used in an excessive amount with respect to the inorganic oxide component. Usually, the silicon halide is used in an amount of 1 to 100 mols, preferably 1 to 50 mols, per mol of the element belonging to Group II, III or IV of the periodic table.

The temperature at which the inorganic oxide component is contacted with the silicon halide preferably is 0° to 200 ° C. When the contact temperature is high, e.g., as high as 300 ° C., heat decomposition of the silicon halide tends to occur and thus is undesirable.

The inorganic oxide component and the silicon halide can be contacted as they are, or they are contacted with each other in an hydrocarbon solvent such as hexane, heptane, benzene, toluene, xylene, etc.

The period of time for which the inorganic oxide component and silicon halide are contacted usually is from 5 minutes to 24 hours. It is advantageous to carry out the contact in an atmosphere of an inert gas such as nitrogen gas.

After contacting, it is preferred to wash the inorganic oxide component by decantation since washing treatment permits contact with an alcohol which follows to proceed advantageously. The above-described hydrocarbon solvents can be used as a solvent for washing.

Then, the inorganic oxide component contacted with the silicon halide can be further contacted with an alcohol, if desired.

1-(A)-(a)-2-2 Organic Silicon

The organic silicon which can be used in the present invention is a compound which is represented by formula $(R^1)_3SiX$ wherein $R^1$ represents an alkyl group, a phenyl group or a vinyl group, X represents a group which can react with a hydroxyl group present on the surface of the above-described inorganic oxide component.

Suitable examples of the compound represented by the above formula include alkyl groups such as a methyl group, an ethyl group, a propyl group, a pentyl group, a hexyl group, a heptyl group, etc., a phenyl group, a vinyl group and the like. Of these, alkyl groups are preferred, with a methyl group being particularly preferred.

Suitable examples of the group represented by X include halogen atoms such as —F, —Cl, —Br, etc., alkoxy groups such as —OCH$_3$, —OC$_2$H$_5$, —OCH$_3$H$_5$, —OC$_4$H$_7$, —OC$_6$H$_5$, —OC$_6$H$_4$CH$_3$, etc., amino groups such as —NH$_2$, —NH(CH$_3$)$_2$, —NH(C$_2$H$_5$), —N(C$_2$H$_5$)$_2$, —NHSi(CH$_3$)$_3$, etc., and other groups such as —(CH$_2$)$_2$Cl, —(CH$_2$)$_3$Cl, —(CH$_2$)$_3$NH$_2$, —O$_2$CCH$_3$, —(CH$_2$)SH, etc. Of these, halogen atoms are preferred, with a chlorine atom being particularly preferred. The three $R^1$s in the above formula may be the same or different.

Among the organic silicon compounds, trimethylchlorosiane is preferred.

The same conditions as in the case of the silicon halide can be used with respect to the amount of the organic silicone which is to be contacted with the inorganic oxide component, the temperature at which the inorganic oxide component and the organic silicone are contacted, use of solvents upon such contacting, and the like.

1-(A)-(a)2-3 Alcohol

When the inorganic oxide component which has been contacted with the silicon halide is further contacted with an alcohol, the titanium compound supported on the carrier is prevented from being inactivated and therefore decrease in titanium which is effective to polymerization of polyolefins.

As for the alcohol, monohydric alcohols and polyhydric alcohols can be used.

Suitable examples of the monohydric alcohols include saturated aliphatic alcohols such as methanol, ethanol, propanol, isopropanol, butanol, pentanol, etc., unsaturated aliphatic alcohols such as allyl alcohol, crotyl alcohol, etc., alicyclic alcohols such as cyclopentanol, cyclohexanol, etc., aromatic alcohols such as benzyl alcohol, cinnamyl alcohol, etc., heterocyclic alcohols such as furfuryl alcohol, etc. Suitable examples of the polyhydric alcohols include ethylene glycol, diethylene glycol, triethylene glycol, propylene glycol, glycerol, etc. Of these, aliphatic alcohols are preferred, and more preferred are methanol, ethanol and propanol.

Usually, the amount of the alcohol to be contacted with the inorganic oxide component which has been contacted with the silicon halide is 1 to 100 mols per mol of the silicon halide contacted with the inorganic oxide component.

It is preferred to contact the inorganic oxide component with the alcohol in an inert gas atmosphere such as nitrogen gas. The temperature at which the inorganic oxide component and the alcohol are contacted may be in the range of between room temperature and reflux temperature. Usually the contacting is carried out at reflux temperature. The contacting time is not limited particularly, and it is preferred that the contacting is carried out under reflux for from 0.5 to 24 hours.

After completion of the reaction upon the contacting, it is preferred to sufficiently wash the inorganic oxide component with the alcohol or the above-described solvent for washing.

After completion of the contacting of the alcohol and the inorganic oxide component, it is preferred to sufficiently separate the resulting solid component from the alcohol.

If the alcohol remains in the solid component, there could occur reaction between the remaining alcohol and a magnesium salt of fatty acid or magnesium alkoxide which is added in the subsequent step, giving rise to adverse influence on the activity of the resulting catalyst. It is therefore preferred that the solid component which are separated be dried well.

1-(A)-(a)-3 Magnesium Alkoxide and Magnesium Salt of Fatty Acid

In the present invention, the solid component (a) composed of a magnesium alkoxide and/or magnesium salt of a fatty acid supported on the inorganic oxide component which, if desired, has been pretreated as described above is used as a carrier for catalyst.

As for the magnesium alkoxide, known magnesium alkoxides which are used as a carrier for catalysts employed in the polymerization of olefins of this kind can be used in the present invention.

Of various known magnesium alkoxides, those which are represented by formula (I) are preferred.

$$Mg(OR^2)_t(OR^3)_{2-t} \quad (I)$$

wherein $R^2$ and $R^3$, which may be the same or different, each represents an alkyl group having 1 to 10 carbon atoms, a cycloalkyl group having 5 to 10 carbon atoms, an aryl group having 6 to 10 carbon atoms or an aralkyl group having 7 to 10 carbon atoms, and t is a real number of from 0 to 2.

Suitable examples of the magnesium alkoxide represented by formula (I) include $Mg(OCH_3)_2$, $Mg(OC_2H_5)_2$, $Mg(OC_3H_7)_2$, $Mg(OC_4H_9)_2$, $Mg(OC_6H_{13})_2$, $Mg(OC_8H_{17})_2$,

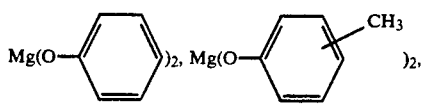

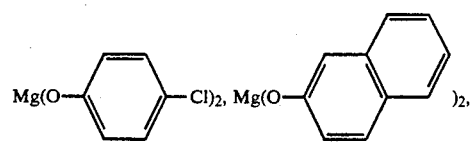

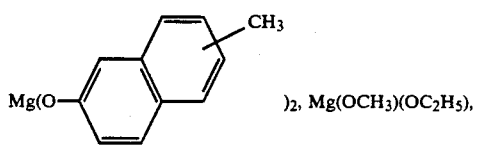

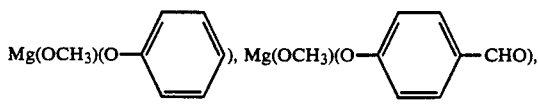

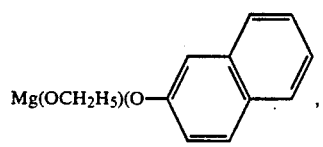

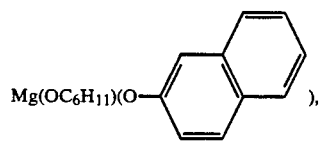

etc.

Of these, dialkoxymagnesiums having an alkoxy group such as a lower alkyloxy group as a substituent are preferred.

The magnesium of a fatty acid is supported on the above inorganic oxide component in place of the magnesium alkoxide or together therewith.

Suitable examples of the magnesium salt of a fatty acid include magnesium palmirate, magnesium stearate, magnesium behenate, magnesium acrylate, magnesium adipate, magnesium acetylenedicarboxylate, magnesium acetoacetate, magnesium azelate, magnesium citrate, magnesium glyoxalate, magnesium glutarate, magnesium crotonate, magnesium succinate, magnesium isovalerate, magnesium isobutyrate, magnesium octanoate, magnesium valerate, magnesium decanoate, magnesium nonanoate, magnesium dococenoate, magnesium undecenoate, magnesium elaidinate, magnesium linolate, magnesium hexanoate, magnesium heptanoate, magnesium myristate, magnesium laurate, magnesium butyrate, magnesium oxalate, magnesium tartarate, magnesium tetrolate, magnesium hydroacrylate, magnesium pimelate, magnesium pyruvate, magnesium fumarate, magnesium propionate, magnesium maleate, magnesium malonaldehydate, magnesium malonate, etc. Of these, magnesium salts of saturated aliphatic acids are preferred, and magnesium sterate, magnesium octanoate, magnesium decanoate and magnesium laurate are particularly preferred.

1-(A)-(a)-4 Supporting Method

Various methods can be used for supporting the magnesium alkoxide and/or magnesium salt of a fatty acid on the surface of the inorganic oxide component.

According to a preferred method, the inorganic oxide component which has been optionally subjected to the above-described pretreatment is contacted with a mixture composed of at least one member selected from the group consisting of a hydrocarbon, an electron donating compound and an alkoxytitanium and the magnesium alkoxide and/or magnesium salt of a fatty acid dissolved or dispersed in the above member.

The above-described mixture can be prepared in various manners as follows.

(1) When an alcohol as an electron donating compound and a hydrocarbon are used, an alcohol, a hydrocarbon and a magnesium alkoxide are mixed such that the amount of the alcohol is about 1 mol or more per mol of the magnesium alkoxide, and the resulting mixture is heated.

(2) When an alkoxytitanium such as tetraalkoxytitanium is used as an electron donating compound, an alkosytitanium and a magnesium alkoxide are mixed such that the amount of the alkoxytitanium is 0.5 mol or more, preferably 0.5 to 10 mols and more preferably 0.5 to 5 mols, per mol of the magnesium alkoxide.

(3) A magnesium salt of a fatty acid and a hydrocarbon are mixed and the resulting mixture is heated.

Suitable examples of the hydrocarbon include aliliphatic hydrocarbons such as pentane, hexane, octane, decane, dodecane, tetradecane, kerosene, ligroen, petroleum ether, etc., alicyclic hydrocarbons such as cyclopentane, methylcyclopentane, cyclohexane, methylcyclohexane, cyclohexane, etc., aromatic hydrocarbons such as benzene, toluene, xylene, ethylbenzene, cumene, cymene, etc., halogenated hydrocarbons such as dichloroethane, dichloropropane, trichloroethylene, carbon tetrachloride, chlorobenzene, etc. and the like. Among these, hexane, heptane, octane, etc. are preferred.

Suitable examples of the electron donating compound include aliphatic alcohols, aromatic alcohols, ethers, aldehydes, ketones, carboxylic acids, carboxylic acid anhydrides, acid halides, amines, amides, nitriles, isocyanates, etc. Of these, alcohols, particularly methanol, ethanol, etc. are preferred.

Preferred examples of the alkoxytitanium include tetraalkoxytitaniums such as tetramethoxytitanium, tetraethoxytitanium, tetra-n-butoxytitanium, tetraisopropoxytitanium, etc.

In the above-described supporting method, the temperature at which the above-described mixture is contacted with the inorganic oxide component is, for example, from 0° to 300 ° C., preferably from 0° to 200 ° C. and more preferably from 10° to 180 ° C., and the contacting time is from 0.5 to 24 hours and preferably 5 to 24 hours.

Upon the contacting, the above-described mixture can be used in an amount of from 0.5 to 20 mmol as magnesium per gram of the inorganic oxide component. In the case of the magnesium salt of fatty acid, it can be used in an amount of from 0.5 to 20 mmol per gram of the inorganic oxide component.

Alternatively, another method for supporting the magnesium alkoxide and/or magnesium salt of fatty acid on the inorganic oxide component can be used in which metal magnesium and $R^2OH$ and/or $R^3OH$ ($R^2$ and $R^3$, which may be the same or different, each represents an alkyl group having 1 to 10 carbon atoms, a cycloalkyl group having 5 to 10 carbon atoms, an aryl group having 6 to 10 carbon atoms or an arakyl group having 7 to 10 carbon atoms) are reacted, optionally in the presence of at least one member selected from the group consisting of the above-described hydrocarbon, electron donating compound and alkoxytitanium to from an alkoxymagnesium, which then is contacted with the inorganic oxide component.

In order to well support the magnesium alkoxide and/or magnesium salt of fatty acid on the inorganic oxide component, it is preferred to use a depositing agent regardless of whichsoever method is employed.

That is, it is advantageous to add a depositing agent to a mixture composition obtained by contacting a mixture of the inorganic oxide component, which has been optionally subjected to the above-described pretreatment, with a mixture composed of at least one member selected from the group consisting of hydrocarbon, an electron donating compound and an alkoxytitanium and the magnesium alkoxyde and/or magnesium salt of a fatty acid dissolved of dispersed in the above member, and then separate the resulting solid component (a) as by decantation.

Suitable examples of the depositing agent include lower alcohols such as methanol, ethanol, propanol, butanol, pentanol, etc.

In the case where a mixture containing a magnesium alkoxide and/or magnesium salt of a fatty acid using a tetraalkoxytitanium, it is preferred to use a lower alcohol which has an alkyl moiety having a carbon atom number smaller than that of the alkyl moiety contained in the tetraalkoxy-titanium.

The depositing agent is used in an amount sufficient for depositing a magnesium alkoxide and/or magnesium salt of a fatty acid on a carrier for catalyst for use in the polymerization of olefins.

For getting preferable solid component (a), it is not admired to contact the inorganic oxide component containing the magnesium alkoxide and/or magnesium salt of a fatty acid with the depositing agent simultaneously since the activity for polymerization of the catalyst metal supported decreases undesirably.

The solid component (a) thus obtained, either composed of composite inorganic oxide alone or composed of a mixture of the inorganic oxide and the composite inorganic oxide, preferably contains from 0.1 to 20% by weight, more preferably from 0.5 to 10% by weight as magnesium atom of the magnesium alkoxide and/or magnesium salt of a fatty acid based on the total weight of the inorganic oxide(s) which is (are) used as a carrier.

1-(A)-(b) Electron Donating Compound (b)

As for the electron donating compound (b) which is a starting material for preparing the solid catalyst component (A), there can be used organic compounds having an electron donating group containing an oxygen atom, a nitrogen atom or a sulfur atom.

Suitable examples of the electron donating compound (b) include amines, amides, ketones, nitriles, phosphines, phosphorylamides, esters, ethers, thioethers, thioesters, acid anhydrides, acid halides, acid amides, aldehydes, organic acids, etc.

Specific examples thereof include organic acids such as aromatic carboxylic acids, e.g., benzoic acid, p-oxybenzoic acid, etc., acid anhydrides such as succinic anhydride, benzoic anhydride, p-toluylic anhydride, etc., ketones having 3 to 15 carbon atoms such as acetone, methyl ethyl ketone, methyl isobutyl ketone, acetophenone, benzophenone, benzoquinone, etc., aldehydes having 2 to 15 carbon atoms such as acetaldehyde, propinaldehyde, octaldehyde, benzaldehyde, tolualdehyde, naphthaldehyde, etc., monoesters such as methyl formate, methyl acetate, ethyl acetate, vinyl acetate, propyl acetate, octyl acetate, cyclohexyl acetate, ethyl propionate, ethyl butyrate, ethyl valerate, methyl chloroacetate, ethyl dichloroacetate, methyl methacrylate, ethyl crotonate, ethyl pivalate, dimethyl maleate, methyl benzoate, ethyl benzoate, propyl benzoate, butyl benzoate, octyl benzoate, cyclohexyl benzoate, phennyl benzoate, benzyl benzoate, methyl toluylate, ethyl toluylate, amyl toluylate, ethyl ethylbenzoate, methyl anisate, ethyl aniste, ethyl ethoxybenzoate, ethyl p-butoxybenzoate, ethyl o-chlorobenzoate, ethyl naphthoate, etc., aromatic diesters such as dimethyl phthalate, diethyl phthalate, dipropyl phthalate, diisobuthyl phthalate, methyl ethyl phthalate, methyl propyl phthalate, methyl isobutyl phthalate, ethyl propyl phthalate, ethyl isobutyl phthalate, propyl isobutyl phthalate, dimehyl terephthalate, diethyl terephthalate, dipropyl terephthalate, diisobutyl terephthalate, methyl ethyl terephthalate, methyl propyl terephthalate, methyl isobutyl terephthalate, ethyl propyl terephthalate, ethyl isobutyl terephthalate, dimethyl isophthalate, diethyl isophthalate, dipropyl isophthalate, diisobutyl isophthalate, methyl ethyl isophthalate, methyl propyl isophthalate, methyl isobutyl isophthalate, ethyl propyl isophthalate, ethyl isobutyl isophthalate, propyl isobutyl isophthalate, etc., esters having 2 to 18 carbon atoms such as γ-butyrolactone, δ-valerolactone, coumarine, phthalide, ethylene carbonate, etc., acid halides having 2 to 15 carbon atoms such as acetyl chloride, benzyl chloride, toluyl chloride, anisyl chloride, etc., ethers having 2 to 20 carbon atoms such as dimethyl ether, diethyl ether, diisopropyl ether, di-n-butyl ether, diamyl ether, tetrahydrofuran, anisol, diphenil ether, ethylene glycol butyl ether, etc., acid amides such as acetamide, benzoic acid amide, toluylic acid amide, etc., amines such as tributylamine, N,N'-dimethylpiperazine, tribenzylamine, aniline, pyridine, picoline, tetramethylethlenediamine, etc., nitriles such as acetonitrile, benzonitrile, tolunitrile, etc., and the like.

Among them, esters, ethers, ketones, acid anhydrides, etc. are preferred. More preferred electron donating compounds include alkyl esters of an aromatic carboxylic acid, e.g., alkyl (1 to 4 carbon atoms) ester of an aromatic carboxylic acid such as benzoic acid, p-methoxybenzoic acid, p-ethoxybenzoic acid, toluylic acid, etc., diester of an aromatic carboxylic acid such as dipropyl phthalate, diisobutyl phthalate, etc., aromatic ketones such as benzoquinone, etc., aromatic carboxylic acid anhydrides such as benzoic anhydride, etc., ethers such as ethylene glycol butyl ether, etc.

1-(A)-(c) Titanium Halide Compound (c)

As for the titanium halide compound is one of the starting materials for preparing the solid catalyst component (A), there can be used a compound represented by the following formula

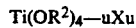
Ti(OR²)₄₋ᵤXᵤ wherein R² represents an alkyl group having 1 to 10 carbon atoms, a cycloalkyl group having 3 to 10 carbon atoms, an aryl group having 6 to 10 carbon atoms, or an aralkyl group having 7 to 10 carbon atoms, X represents a halogen atom, and u is a real number of from 0 to 4.

Specific examples of the titanium halide compound represented by the above formula include titanium tetrahalides such as TiCl₄, TiBr₄, TiI₄, etc., alkoxytitanium trihalides such as Ti(OCH₃)Cl₃, Ti(OC₂H₅)Cl₃, (n-C₄H₉O)TiCl₃, Ti(OC₂H₅)Br₃, etc., alkoxytitanium dihalides such as Ti(OCH₃)₂Cl₂, Ti(OC₂H₅)₂Cl₂, (n—C₄H₉O)₂Ti₂Cl₂, Ti(OC₃H₇)₂Cl₂, etc., trialkoxytitanium monohalides such as Ti(OCH₃)₃Cl, Ti(OC₂H₅)₃Cl, (n-C₄H₉O)₃TiCl, Ti(OCH₃)₃Br, etc.

These can be used singly or as mixtures.

Of these, those having a high halogen content are preferred, with titanium tetrachloride being particularly preferred.

1-(A)-(d) Preparation of Solid Catalyst Component (A)

The solid catalyst component (A) can be prepared, for example as follows:

That is, the solid component (a), the electron donating compound (b) and the titanium halide (c) are contacted with each other, if desired in the presence of the solvent (d) such as a halogenated hydrocarbon, etc., at a temperature of generally from 0° to 200 °C., preferably 10° to 150 °C., for from 2 minutes to 24 hours to form a solid catalyst component (A).

In this case, the electron donating compound (b) and/or the titanium halide (c) can co-exist in an intermediate stage for preparing the solid component (a) or at first the solid component (a) can be reacted with the electron donating compound and then the product is contacted with the titanium halide (c).

1-(A)-(d)-i Solvent (d)

As for the solvent (d), there can be used those organic solvents which are inert to the magnesium compound (a), the electron donating compound (b) and titanium halide (c), for example, aliphatic hydrocarbons such as hexane, heptane, etc., aromatic hydrocarbons such as benzene, toluene, etc., and halogenated hydrocarbons.

The halogenated hydrocarbons which can be used include for example, mono- and polyhalogenated derivatives of saturated or unsaturated aliphatic hydrocarbons having 1 to 12 carbon atoms, saturated or unsaturated alicyclic hydrocarbons having 3 to 12 carbon atoms and aromatic hydrocarbons having 6 to 12 carbon atoms.

Specific examples of the halogenated hydrocarbons belonging to the aliphatic hydrocarbon compound include methyl chloride, methyl bromide, methyl iodide, methylene chloride, methylene bromide, methylene iodine, chloroform, bromoform, iodoform, carbon tetrachloride, carbon tetrabromide, carbon tetraiodide, ethyl chidride, ethyl bromide, ethyl iodide, 1,2-dichloroethane, 1,2-dibromoethane, 1,2-diiodoethane, methylchloroform, methylbromoform, methyliodoform, 1,1,2-trichloroethylene, 1,1,2-tribromoethylene, 1,1,2,2-tetrachloroethylene, pentachloroethane, hexachloroethane, hexabromoethane, n-propyl chloride, 1,2-dichloropropane, hexachloropropylene, octachloropropane, decabromobutane, chlorinated paraffin, etc.

Specific examples of halogenated hydrocarbons belonging to the allcyclic compound include chlorocyclopropane, tetrachlorocyclopentane, hexachlorocyclopentadiene, hexachlorocyclohexane, etc.

Specific examples of halogenated hydrocarbons belonging to the aromatic compounds include chlorobenzene, bromobenzene, o-dichlorobenzene, p-dichlorobenzene, hexachlorobenzene, hexabromobenzene, benzotrichloride, p-chlorobenzotrichloride, etc.

These compounds can be used singly or two or more of them can be used in admixture.

Of the above-described halogenated hydrocarbons, halogenated aliphatic hydrocarbons are preferred, with dihalogenated aliphatic hydrocarbons such as 1,2-dichloroethane, methylene chloride, etc. being particularly preferred.

Preferred examples of the solvent (d) include aliphatic hydrocarbons such as n-heptane, etc.

1-(A)-(e)-2 Amount of Metal Supported in Solid Catalyst Component (A)

The solid catalyst component (A) thus obtained preferably contains titanium atom in an amount of from 0.1 to 20% by weight, more preferably from 0.5 to 10% by weight.

1-(B) Organic Metal Compound

The catalyst which is used in the method of the present invention are comprised of the solid catalyst component (A), the organic metal compound (B) and the electron donating compound (C).

As for the organic metal compound (B), various compounds are known and there is no limitation to use such known compounds. Examples of the metal contained in the organic metal compound include lithium, sodium, potassium, zinc, cadmium, aluminium, etc. Aluminium is particularly preferred. That is, organic aluminium compounds are preferred as the organic metal compound.

1-(B)-1 Organic Aluminium

As for the organic aluminium compound, there can be widely used a compound represented by formula $$Al(R^4)_v X_{3-v}$$

$$Al_2 R^4 X_3$$

wherein $R^4$ represents an alkyl group having 1 to 10 carbon atoms, a cycloalkyl group having 3 to 10 carbon atoms or an aryl group having 6 to 10 carbon atoms, X represents a halogen atom such as a chlorine atom, a bromine atom, etc., and v is a real number of from 1 to 3.

Specifically, preferred examples of the aluminium compound represented by the above formulae include trialkyl-aluminiums such as trimethylaluminium, triethylaluminium, triisopropylaluminium, triisobutylaluminium, trioctylaluminium, etc., dialkylaluminium monohalides such as diethlaluminium monochloride, diisopropylaluminium monochloride, diisobutylaluminium monochloride, dioctylaluminium monochloride, etc., alkylaluminium sesquihalides such as ethylaluminium sesquihalide, etc. and mixtures thereof.

1-(C) Electron Donating Compound (C)

As for the electron donating compound (C), there can be used organic compounds which contain oxygen, nitrogen, phosphor or sulfur, and organic silane compounds. The compounds exemplified in 1-(A)-(b) above can be used as such organic compounds.

As for the organic silane compound, there can be used those compounds which contain Si—O—C bonding, for example, alkoxysilanes, aryloxysilanes, etc. Examples of such compounds are silicic acid esters represented by formula $$(R^5)_w Si(OR^6)_{4-w}$$

wherein $R^5$ represents an alkyl group, a cycloalkyl group, an aryl group, an alkenyl group, a haloalkyl group, an aminoalkyl group or a halogen atom, $R^6$ represents an alkyl group, a cycloalkyl group, an aryl group, an alkenyl group or an alkoxyalkyl group, and w is $0 \leq w \leq 3$, provided that when there are plural ($R^5$)'s they may be the same or different.

Other examples of the organic silane compound include siloxanes having a group $OR^e$ or silyl esters of a carboxylic acid and the like. Yet another examples of the organic silane compound include those compounds which have been converted to an organic silane compound having an Si—O—C bonding by reacting a silicon compound not containing an Si—O—C bonding with a compound containing an O—C bonding previously or during the polymerization of α-olefins. For example, a combination of $SiCl_4$ and an alcohol can be used.

Specific examples of the organic silane compound containing an Si—O—C bonding include trimethylmethoxysilane, trimethylethoxysilane, dimethyldimethoxysilane, dimethyldiethoxysilane, diphenyldimethoxysilane, methylphenyldimethoxysilane, diphenyldiethoxysilane, ethyltrimethoxysilane, vinyltrimethoxysilane, methyltrimethoxysilane, phenyltrimethoxysilane, γ-chloropropyltrimethoxysilane, methyltriethoxysilane, ethyltriethoxysilane, vinyltriethoxysilane, butyltriethoxysilane, phenyltriethoxysilane, γ-aminopropyltriethoxysilane, chlorotriethoxysilane, ethyltriisopropoxysilane, vinyltributoxysilane, ethyl silicate, butyl silicate, trimethylphenoxysilane, methyltriallyloxysilane, vinyltris (β-methoxy-ethoxy) silane, vinyltriacetoxysilane, dimethyltetraethoxy-disiloxane, etc.

The above-described various electron donating compounds (C) can be used singly or two or more of them can be used in combination.

Of the electron donating compound (C), preferred are esters, ethers, ketones, acid anhydrides, organic silane compounds containing an Si—O—C bonding.

Particularly, alkyl esters of aromatic carboxylic acids, for example, an alkyl ester of an aromatic carboxylic acid such as benzoate, p-methoxybenzoate, p-ethoxybenzoate, toluylate, etc. having 1 to 4 carbon atoms in the alkyl moiety, phenydialkoxysilanes such as diphenyldimethoxysilane, etc. are preferred. Also, aromatic ketones such as benzoquinone, etc., aromatic carboxylic acid anhydrides such as bonzoic anhydride, etc., ethers such as ethylene glycol butyl ether, etc. are preferred.

The electron donating compound (C) may be the same as or different from the electron donating compound (b) used in the preparation of the solid catalyst component (A).

1-2 Composition of Catalyst Component

Various components of the catalyst for the polymerization of olefins are contained in amounts set forth below. Usually, the solid catalyst component (A) is used in an amount of from 0.001 to 1 mmol/l as titanium. The organic metal compound (B) is contained in an atomic ratio of metal/titanium of from 1 to 1000, preferably from 5 to 500. The electron donating compound (C) is used in an amount of electron donating compound (C) /titanium of from 0.01 to 100 (mol/atom).

In the method of the present invention, use of a catalyst comprising an aromatic dicarboxylic acid ester as a raw material of the solid catalyst component and an organic silane compound containing an Si—O—C bonding as the electron donating compound gives rise to maximized activity.

2 Polymerization

In the present invention, α-olefin is polymerized in the presence of the above-described catalyst to produce polyolefins.

As the α-olefin, there can be used those represented by formula

wherein $R^7$ represents a hydrogen atom, an alkyl group having 1 to 20 carbon atoms or a cycloalkyl having 3 to 20 carbon atoms.

Specific examples of such α-olefin include straight chain monoolefins such as ethylene, propylene, butene-1, pentene-1, octene-1, etc., branched chain monoolefins such as 4-methylpentene-1, etc., and vinylcyclohexene, etc.

The α-olefin which is subjected to polymerization reaction can be used either singly to form a homopolymer or in combination of two or more of them to form a random or so-called block copolymer.

Upon copolymerization, α-olefin(s) can be copolymerized with an unsaturated compounds such as a conjugated diene or an unconjugated diene.

The polymerization reaction used in the method of the present invention can be carried out in a conventional manner under conditions commonly used in the field of polymerization of olefins.

Generally, a slurry polymerization method, a bulk polymerization method, a vapor phase polymerization method, etc. can be used.

The polymerization temperature is generally 20° to 100°C., preferably 40° to 90°C., and the polymerization pressure is usually 1 to 100 Kg/cm²G, preferably 5 to 50 Kg/cm²G.

Generally, the polymerization reaction can be carried out by a solution polymerization method using as a solvent an aliphatic, alicyclic or aromatic hydrocarbon or a mixture thereof. Suitable examples of the solvent include propane, butane, pentane, hexane, heptane, cyclohexane, benzene, etc. and mixtures thereof. Also, a vapor phase polymerization method and a bulk polymerization method in which a liquid monomer itself is used as a solvent, can be applied.

The molecular weight of polyolefin produced according to the method of the present invention varies depending on the manner of polymerization reaction, catalyst system used, conditions for polymerization applied, and can be controlled, if desired, by the addition of hydrogen gas, alkyl halides, dialkylzinc, etc.

Although description has been made hereinabove relative to general polymerization reaction in the presence of a special catalyst of the present invention, the method of the present invention can be employed to produce various polyolefins having specific characteristics as set forth hereinbelow by selecting the kind of the α-olefin and adopting special polymerization procedures.

2-1 Propylene Two-Stage Polymerization Method

This method is to polymerize propylene in two stages in the presence of the above-described catalyst.

In the first stage of the polymerization reaction, substantially polymerization of propylene occurs, and in the second stage, polymerization of propylene and an α-olefin other than propylene proceeds in the presence of the propylene homopolymer prepared in the first stage.

It should be noted that both when copolymerization between propylene and an α-olefin other than propylene is carried out in both the first and second stages, and when copolymerization between propylene and an α-olefin other than propylene is carried out in the first stage and homopolymerization of propylene is carried out in the second stage in the presence of the propylene copolymer obtained in the first stage, no polymer that has a high, well balanced stiffness and impact strength can be obtained. This is quite surprising.

Any type of polymerization method can be used. For example, a vapor phase polymerization method, a bulk polymerization method in which liquid monomer itself serves as a solvent, a slurry polymerization method, etc. can be used. Of these, a slurry polymerization method is preferred.

When the vapor phase polymerization method is employed, a step of recovering a solvent for polymerization can be eliminated and as a result a step of dying the resulting polymer can be simplified to a greater extent.

If the polymerization reaction is carried out according to a slurry polymerization method, the amount of soluble polymers which are by-produced can be reduced.

The two-stage polymerization reaction can proceed as follows.

That is, first and second reactors, for example, fluidized bed reactors are connected in series. In the first reactor, gaseous or liquid propylene is supplied to a reaction system containing the above-described catalyst while stirring the reaction system, and if desired, a hydrocarbon which is volatile but is not polymerizable such as propane, butane, pentane, etc. is supplied in a gaseous state to the reaction system so as to keep it in a fluidized condition, and the polymerization in the first stage is carried out by heating to a predetermined temperature under a predetermined polymerization pressure. In the second reactor, propylene and an α-olefin other than propylene are supplied to the reaction product transported directly from the first reactor or the reaction product transported from the first reactor and passed through a deaeration apparatus provided between the first and second reactors so as to remove unused propylene and the like gaseous components, and the second stage polymerization reaction is carried out at a predetermined polymerization temperature and at a predetermined polymerization pressure while keeping the reaction system in a fluidized condition. If desired, a prepolymerization can be carried out in which a small amount propylene is polymerized prior to the polymerization reaction in the first stage.

As for the α-olefin other than propylene, there can be used straight chain monoolefins such as ethylene, butene-1, hexene-1, octene-1, etc., branches chain monoolefins such as 4-methylpentene-1, etc., and dienes such as butadiene, etc.

In order to obtain polymers having preferable properties, it is advantageous to use ethylene as the α-olefin other than propylene.

The catalyst can be supplied in the form of a suspension in an inert solvent or an α-olefin. Hydrogen gas which is used for controlling the molecular weight of the product can be supplied to the reactor at a desired position.

In the vapor polymerization method, the amount of a gas to be supplied is preferably maintained such that the flow rate of the gas is maintained in a range appropriate for facilitating fluidization of the reaction bed, decreasing the load of mechanical agitation and preventing the occurrence of entrainment. Assuming that the minimum fluidizing speed is Umf, it is preferred that the flow rate of the gas be from about 0.1Umf to about 10 Umf, preferably from about 0.2 Umf to about 3 Umf.

The polymerization temperature is usually from 50° to 90°C., preferably from 60° to 85°C., for the first stage polymerization, and it is usually 80 °C. or less, preferably from 30° to 70 °C. for the second stage polymerization.

The polymerization pressure in each of the first and second stage polymerization reactions varies depending on the kind of the reactor, capability of removing the reaction heat, type of the polymerization reaction, etc. but usually is from 1 to 50 Kg/cm$^2$G.

In the first stage polymerization reaction, substantially propylene is polymerized to produce a propylene homopolymer.

In this case, the amount of the propylene homopolymer produced is from 55 to 95% by weight, preferably from 65 to 90% by weight, based on the total weight of the polymer obtained after the second stage polymerization reaction. This amount can be adjusted to a desired level by controlling the second stage polymerization reaction.

It is preferred that the propylene homopolymer obtained have an intrinsic viscosity number [$\eta$] of from 1.0 to 3.0 dl/g, preferably from 1.2 to 2.5 dl/g (135 °C., tetralin solution).

When the propylene homopolymer has an intrinsic viscosity number of below 1.0 gl/g, the polymer as a final product has an increased viscosity and it is sometimes difficult to carry out the polymerization reaction continuously, and in addition the impact of the product tends to decrease. On the other hand, when the propylene homopolymer has an intrinsic viscosity number of above 3.0 dl/g, the polymer finally obtained sometimes has a decreased stiffness.

The propylene homopolymer having an intrinsic viscosity number within the above-described range can be prepared by controlling the concentration of hydrogen gas in the reactor used in the first stage polymerization reaction.

Further, the propylene homopolymer prepared by the first stage polymerization reaction preferably has an isotactic index (for short "I.I.", indicating ratio of boiling n-heptane-insoluble component) of 90% by weight or more, and more preferably 95% by weight or more. When I.I. is below 90 % by weight the propylene polymer finally obtained tends to have a decreased stiffness.

The propylene homopolymer having I.I. within the above-described range can be prepared by controlling the molar ratio of the organic aluminium compound (b) to the electron donating compound (c).

The polymer obtained in the first stage polymerization reaction may contain an $\alpha$-olefin other than propylene in an amount of 1 mol % or less.

In the second stage, it is presumed that mainly copolymerization reaction between propylene and an $\alpha$-olefin other than propylene proceeds in the presence of the propylene homopolymer prepared in the first stage, and as a result a copolymer of propylene and an $\alpha$-olefin other than propylene is formed.

However, there is also a possibility that there occur various other reactions such as a reaction in which the molecular chain of the propylene homopolymer prepared in the first stage is extended, a reaction in which other $\alpha$-olefin is polymerized to form a homopolymer, a reaction in which a propylene homopolymer is freshly prepared, and the like. If such side reactions could occur, the polymer obtained by the two-stage polymerization reaction contain a propylene homopolymer and a homopolymer of an $\alpha$-olefin other than propylene in admixture. If so, it is presumed that the side reactions would occur in a very low chance.

If side reactions could occur in the second stage, it is presumed that after all when the second stage polymerization reaction is over, a mixture of a copolymer propylene and and $\alpha$-olefin other than propylene and a propylene homopolymer is obtained.

In the second stage polymerization reaction, the copolymer which contains as a monomer unit an $\alpha$-olefin other than propylene in an amount of from 20 to 80% by weight, preferably from 30 to 70% by weight, is prepared such that the copolymer occupies from 45 to 5% by weight, preferably from 35 to 10% by weight, based on the total weight of the mixture of the polymers.

When the content of the $\alpha$-olefin other than propylene as a monomer unit in the mixture obtained is 20% by weight, articles molded from the mixture produced by this method have a decreased impact strength, and when that content is above 80 % by weight, the stiffness of the molded articles is reduced.

On the other hand, when the amount of the copolymer prepared is above 45% by weight, the stiffness of articles molded from the polymer mixture finally obtained is decreased, while when that amount is below 5% by weight the impact strength of the molded articles is lowered.

The polymer mixture obtained preferably has an intrinsic viscosity number [$\eta$] of 2.0 dl/g or more, and more preferably from 2.8 to 15 dl/g. When its intrinsic viscosity number is below 2.0 dl/g, articles molded from the polymer finally obtained tend to have a reduced impact strength.

The polymer mixture which has an intrinsic viscosity number falling within the above-described range can be prepared by controlling the concentration of hydrogen gas in the reactor for polymerization reaction.

In the vapor phase polymerization method, nitrogen gas can be passed to polymer powders taken out from the polymerization reactor, as a post treatment after the second stage polymerization reaction, in order to strip out olefins contained in the powders. If desired, the polymer powders can be pelletized using an extruder. In this case, a small amount of water, alcohol, etc. can be added in order to inactivate the catalyst completely. In the slurry polymerization method, after the polymerization reaction in the second stage, the polymer taken out from the polymerization reactor can be completely removed solvents and unused monomers, dried and pelletized.

The polymer mixture obtained by the two-stage polymerization method as stated above can be molded into articles having excellent, well balanced stiffness and impact strength in contrast to a polymer blend obtained by simply blending from 55 to 95% by weight of a propylene homopolymer and from 45 to 5% by weight of a propylene copolymer separately prepared.

Since it has an excellent particle size distribution and flow behavior, the propylene polymer produced by the two-stage polymerization method can be transported in the form of powder advantageously.

Therefore, the propylene polymer produced according to the method of the present invention not only are suitable as a material for producing exterior and interior automotive trims, domestic electric appliances, etc. but also are convenient for transportation.

2-2 Method for Producing Propylene Random Copolymer

This method is to produce a propylene random copolymer containing an $\alpha$-olefin other than propylene as a monomer unit in an amount of from 0.5 to 20% by weight by copolymerizing propylene with the α-olefin in the presence of the above-described catalyst.

In order to obtain a propylene random copolymer having desired properties, it is preferred to use ethylene and butene-1 as the α-olefin other than propylene.

In this method, the amount of propylene or of the α-olefin other than propylene is controlled such that the α-olefin other than propylene as a monomer unit is contained in the propylene random copolymer finally obtained in an amount of from 0.5 to 20% by weight.

When the content of the α-olefin other than propylene is below 0.5% by weight, films or sheets formed from the propylene random copolymer sometimes have a poor transparency and heat setting properties. On the other hand, when the content of the other olefin is above 20% by weight, the propylene random copolymer tends to have a poor flow behavior.

In the range of the content of the α-olefin other than propylene, a preferred range of that content varies depending upon the kind of the α-olefin. For example, in the case of propylene random copolymer from propylene and ethylene, the content of ethylene as a monomer unit is preferably from 0.5 to 8% by weight, more preferably from 2 to 6% by weight. For the propylene random copolymer from propylene, ethylene and butene-1, the content of ethylene as a monomer unit is preferably from 0.5 to 5% by weight, more preferably from 1 to 4% by weight, while the content of butene-1 as a monomer unit is preferably from 1 to 10% by weight, more preferably from 1.5 to 8% by weight. For the propylene random copolymer from propylene and butene-1, the content of butene-1 as a monomer unit is preferably from 1 to 20% by weight, more preferably from 3 to 15% by weight.

The same type of polymerization reactions as for the propylene two-stage polymerization method described in 2-1 above can be used for producing a propylene random copolymer.

The procedures of this polymerization proceeds, for example as follows.

That is, propylene and an α-olefin other than propylene are supplied to the reaction system and a polymerization reaction is carried out at a predetermined polymerization temperature and at a predetermined polymerization pressure while keeping the reaction system in a fluidized condition. If desired, a prepolymerization can be carried out in which a small amount of propylene is polymerized prior to the polymerization reaction, or polymerization reaction can be carried out after polypropylene powders obtained by the prepolymerization are added to the reaction system.

The catalyst components can be supplied in the form of a suspension in an inert solvent or an α-olefin. Hydrogen gas which is used for controlling the molecular weight of the product to the reactor at a desired position.

In the vapor polymerization method, the amount of a gas to be supplied is preferably maintained such that the flowrate of the gas is maintained in a range appropriate for facilitating fluidization of the reaction bed, decreasing the load of mechanical agitation and preventing the occurrence of entrainment. Assuming that the minimum fluidizing speed is represented by Umf, it is preferred that the flow rate of the gas be from about 0.1 to about 10 Umf, preferably from about 0.2 Umf to about 3 Umf.

The polymerization temperature is usually 80° C. or less, preferably from 30° to 70° C.

The polymerization pressure varies depending on the kind of the catalyst used, retention time thereof, characteristics of the reactor, capability of removing the reaction heat, type of the polymerization reaction, etc. but usually is from 1 to 50 kg/cm$^2$G.

The propylene random copolymer thus obtained generally has an intrinsic viscosity number [η] of 1.0 dl/g or more, and it is preferred that the copolymer has an intrinsic viscosity number of from 1.2 to 3 dl/g when it is for forming films.

The propylene random copolymer having an intrinsic viscosity number falling within the above-described range can be prepared by controlling the concentration of hydrigen gas in the polymerization reactor.

Substantially the same post treatments as in the propylene two-stage polymerization method in 2-1 above can be used.

The propylene polymer obtained by the method of the present invention in most cases is a random copolymer of propylene and an α-olefin other than propylene and has excellent powder flowability and particle size distribution. The propylene random copolymer has an improved low temperature heat sealing property and can be transported in the form of powder advantageously.

Therefore, the propylene random copolymer obtained by this polymerization method is suitable as a material for producing molded articles such as film, sheets, etc.

2-3 Polymerization of Butene-1

This polymerization method is to polymerize butene-1 alone or butene-1 and an α-olefin other than butene-1 in the presence of the above-described catalyst to produce a butene-1 homopolymer or butene-1 copolymer.

When production of butene-1 homopolymer is intended, butene-1 alone is supplied to a polymerization reactor and polymerization reaction is carried out in a conventional manner.

On the other hand, when it is intended to produce butene-1 random copolymer, butene-1 and an other olefin are supplied to a reaction reactor such that the content of butene-1 as a monomer unit in the copolymer is from 60 to 99.5% by weight, preferably from 70 to 98% by weight, and then polymerization reaction is carried out.

In this case, similar polymerization procedures to those in the propylene two-stage polymerization method in 2-1 above can be used. That is, there can be used a first stage polymerization treatment in which an α-olefin other than butene-1 is homopolymerized and a second polymerization treatment in which a copolymerization of butene-1 or butene-1 and an other olefin in the presence of the homopolymer prepared in the first stage.

Suitable examples of the other olefin which can be used include straight chain monoolefins such as propylene, ethylene, hexene-1, octene-1, etc., branched chain monoolefins such as 4-methylpentene-1, etc., dienes such as butadiene, etc., and the like.

In order to obtain polymers having desirable properties, it is advantageous to use propylene as the α-olefin other than butene-1.

The same type of polymerization reactions as for the propylene two-stage polymerization method described in 2-1 above can be used for producing a butene-1 polymer.

The polymerization procedures are substantially the same as those used in the propylene two-stage polymerization method described in 2-1 above. In this case, the amount of the homopolymer of the olefin other than butene-1 such as propylene homopolymer prepared in the first stage is such that the homopolymer occupies from 0.5 to 30% by weight, preferably from 2 to 15 % by weight based on the total weight of the product finally obtained in the second stage.

The homopolymer preferably has an intrinsic viscosity number[$\eta$] of from 1.0 to 6.0 dl/g, preferably from 1.2 to 5.0 dl/g, (135 °C., tetralin solution). When this intrinsic viscosity number is below 1.0 dl/g the polymer mixture finally obtained tends to have an increased tackiness resulting in that continuous polymerization is difficult to carry out. On the other hand, when the intrinsic viscosity is above 6.0 dl/g the polymer mixture finally obtained sometimes has a poor appearance.

In addition, it is preferred that the homopolymer has I.I. of 90% by weight or more, and more preferably 95% by weight or more. When its I.I. is below 90% by weight the polymer mixture finally obtained has an increased tackiness and it is sometimes difficult to carry out polymerization continuously.

By the second stage polymerization procedures, a butene-1 homopolymer or a copolymer of butene-1 and an other $\alpha$-olefin can be obtained. That is, the butene-1 homopolymer or butene-1 copolymer containing the other $\alpha$-olefin as a monomer unit in an amount of from 0.5 to 30% by weight, preferably from 1 to 20% by weight is prepared such that the homopolymer or the copolymer occupies from 99.5 to 70% by weight, preferably from 98 to 85%, based on the total weight of the polymer mixture finally obtained by the two-stage polymerization method.

When the content of the $\alpha$-olefin other than butene-1 such as propylene as a monomer unit is below 0.5% by weight, the polymer finally obtained by this method shows a decreased rate of crystal transformation resulting in that deformation of articles molded threfrom tends to occur. On the other hand, when that content is above 30% by weight, the stiffness and heat resistance of the molded articles are decreased.

If the amount of the butene-1 homopolymer or butene-1 copolymer produced is above 99.5% by weight, the polymer mixture finally obtained has an increased tackiness and it is difficult to carry out polymerization reaction continuously, while the polymer finally obtained has a decreased heat resistance with that amount being below 70% by weight.

It is preferred that the butene-1 homopolymer or butene-1 copolymer obtained has an intrinsic viscosity number [$\eta$] of from 1.0 to 6.0 dl/g, more preferably from 1.2 to 5.0dl/g. When its intrinsic viscosity number is below 1.0 dl/g , the polymer finally obtained sometimes has an increased tackiness.

The polymerization temperature in the vapor polymerization method is usually from 40° to 90 °C., preferably, and it is usually 80 °C. or less, preferably from 30° to 70 °C. for the second stage polymerization. In the slurry polymerization method, it is 50 °C. or less both for the first and second stage polymerizations.

The polymerization pressure varies depending on the kind of the catalyst used, retention time thereof, characteristics of the reactor, capability of removing the reaction heat, type of the polymerization reaction, etc, but usually is from 1 to 30 kg/cm$^2$G.

The copolymer having an intrinsic viscosity number falling within the above-described range can be prepared by controlling the concentration of hydrogen gas in the polymerization reactor. The catalyst components can be supplied in the form of a suspension in an inert solvent, an $\alpha$-olefin, etc.

Substantially the same post treatments as in the propylene two-stage polymerization method in 2-1 above can be used.

The butene-1 homopolymer or copolymer prepared by this polymerization method has excellent particle size distribution and flow behavior, and can be transported in the form of powder advantageously. It is further advantageous in that it has a high stereoregularity and that the amount of the catalyst residue in the resulting is minimized.

Therefore, the butene-1 homopolymer or copolymer obtained by this polymerization method is suitable as a material for producing molded articles such as various types of pipes and films, etc.

3 Benefits or Advantages of the Present Invention

The present invention has the following benefits or advantages.

3-1

(1) The catalyst used in the present invention has a high catalytic activity which lasts for a long period of time.

(2) Since the catalyst used has a high activity, the polymerization reaction can be carried out in a stabilized condition even when an $\alpha$-olefin is polymerized by a multistage polymerization method.

(3 ) Polymerization reaction using the above-described catalist gives rise to polyolefins which contain substantially no catalyst residue. Therefore, when the polyolefin is molded, molding machines are not corroded and the surface of molded articles can be finished beautifully, resulting in that the molded articles having a high commercial value can ba produced.

(4) When the polymerization of an $\alpha$-olefin is carried out using the above-described catalyst, the polyolefin produced contain substantially no fine polymer powder having a particle size of 100 $\mu$m or less. Therefore, powdery polylefin can be transported smoothly without causing clogging of pipelines. Further, the polyolefin obtained has high bulk density and as a result the polyolefin can be transported in the form of powder efficiently.

3-2

In the polymerization method described in 3-1 above, polymerization of an $\alpha$-olefin in the presence of a catalyst composed of the catalyst component (A), organic aluminium compound (B) and organic silane compound (C) gives rise to, in addition to the benefits described in 3-1 above, an advantage that polyolefins, in particular polypropene, having a narrow molecular weight distribution can be obtained.

3-3

The catalytic activity of titanium can be increased by the use of, as a solid component (a) in the catalyst to be used in the polymerization method described in 3-1 above, a carrier prepared by contacting, with a mixture containing at least one member selected from the group consisting of a hydrocarbon, an electron donating compound and an alkoxytitanium, and a magnesium alkoxide, a solid residue which is obtained by pretreatment of at least one oxide selected from the group consisting of oxides of elements belonging to Groups II, III and IV of the periodic table and/or a composite oxide containing at least one such oxide with a silicon halide and optionally with an alcohol in this order and removing a liquid.

When as a solid component (a) in the catalyst to be used in the polymerization method described in 3-1 above, a carrier is used which is prepared by adding a mixture composed of at lest one member selected from the group consisting of a hydrocarbon, an electron donating compound and an alkoxytitanium, and a magnesium alkoxide to a solid residue composed of at least one oxide selected from the group consisting of oxides of elements belonging to Groups II, III and IV of the periodic table and/or a composite oxide containing at least one such oxide or to a solid residue obtained by pretreating at least one oxide selected from the group consisting of oxides of elements belonging to Groups II, III and IV of the periodic table and/or a composite oxide containing at least one such oxide with a silicon halide and optionally with an alcohol in this order and removing a liquid, and further adding thereto a depositing agent composed of at least one member selected from the group consisting of a lower alcohol and a halogenating agent, then the magnesium alkoxide can be deposited on the carrier sufficiently, thus giving rise to a carrier which has an almost uniform particle size and there occurs no agglomeration of carrier particles and which does not inhibit the activity of metal titanium supported thereon. Therefore, the catalyst using a carrier containing a magnesium alkoxide have a high activity and polyolefins obtained by polymerizing $\alpha$-olefins in the presence of this catalyst have good particle size characteristics.

Further, when as a solid component (a) in the catalyst to be used in the polymerization method described in 3-1 above, a carrier is used which is prepared by pretreating at least one oxide selected from the group consisting of oxides of elements belonging to Groups II, III and IV of the periodic table and/or a complete inorganic oxide containing at least one such oxide with an organic silane compound represented by formula $R_3SiX$ 

wherein R represents an alkyl group, a phenyl group or a vinyl group, and X represents a group capable of reacting with a hydroxyl group present on the surface of the at least one oxide and/or the composite inorganic oxide, and contacting the thus-treated oxide and/or the composite inorganic oxide with the mixture containing a magnesium alkoxide, and further adding the depositing agent thereto so that the magnesium alkoxide can be deposited on the carrier sufficiently, then a polyolefin can be obtained which has in addition to the above-described benefits an advantage that it has a narrow particle size distribution.

3-4

When two-stage polymerization of propylene is carried out in the presence of the catalyst having a high activity described in 3-1 above, the following benefits can be obtained.

(1) A step of removing the catalyst residue from the polypropylene produced can be eliminated.

( 2 ) Polypropylenes can be produced which have excellent, well balanced mechanical characteristics such as stiffness and impact strength and therefore can be used as a useful material for producing molded articles in the field of domestic electric appliances, automobiles, etc.

(3) Polypropylenes can be obtained which have excellent powder flowability and particle size distribution.

3-5

When propylene and an other $\alpha$-olefin are polymerized in the presence of the catalyst having a high activity described in 3-1 above to prepare a copolymer of which the content of the other $\alpha$-olefin as a monomer unit is from 0.5 to 20% by weight, the copolymer has in addition to the above-described benefits advantages that it can be formed into various articles such as films, sheets, etc. which have an excellent low temperature heat sealing property.

3-6

When a polybutene or a copolymer of butene-1 and an other $\alpha$-olefin, particularly that in which the content of butene-1 as a monomer unit is from 60 to 99.5% by weight, is prepared in the presence of the catalyst having a high activity described in 3-1 above, a polyolefin which is suitable as a material for producing various molded articles such as pipes, films, etc.

The method of the present invention will be described in greater detail with reference to non-limitative examples and comparative examples.

EXAMPLE 1

(1) Preparation of Solid Catalyst Component

In a 1l glass reactor purged with argon were charged 40 g of silicon dioxide which was evacuated and calcined at 500 ° C. (a product by Fuji Davison Co., Ltd., grade 952, specific surface area: 350 m$^2$/g, average particle size: 54 to 65 $\mu$m) and 200 ml of trimethylchlorosilane, and the mixture was allowed to react with stirring under reflux for 12 hours. Then, the reaction mixture was decanted three times using 200 ml of n-heptane and dried to obtain solid component of silicon dioxide.

Thus-obtained solid component was subjected to determination of the concentration of a hydroxyl group by the reaction with methylmagnesium iodide and it was found that the hydroxyl group concentration was 0.3 $\mu$mol/m$^2$.

To the solid component (20g) was added 100 ml of n-heptane solution containing diethoxymagnesium (120 mmol) and tetra-n-butoxytitanium (70 mmol), and the mixture was allowed to stand at room temperature for 1 hour. Thereafter, 50 ml of isopropanol was added portionwise, followed by stirring at 80 ° C. for 1 hour. Decantation with 100 ml of n-heptane was repeated 5 times and the residue was dried under reduced pressure at 80 ° C. to obtain a white catalyst carrier. The catalyst carrier contained 3.8% by weight of magnesium atom.

Thus-obtained catalyst carrier (10.0 g) was charged in a 0.5 l glass reactor, and 50 mR of n-heptane, 5.2 mmol of ethyl benzoate, and 60 g of titanium tetrachloride. The resulting mixture was stirred for 1 hour under reflux. Then, the supernatant was removed by decantation and the solid portion was well washed with hot n-heptane to obtain a solid catalyst component, which contained 2.3% by weight of Ti.

(2) Polymerization of Propylene

In a 1 l autoclave purged with argon were charged 50 ml of hexane having suspended therein 0.006 mmol Ti of the solid catalyst component, 1.5 mmol of triisobutylaluminium and 0.41 mmol of methl p-toluylate. After the autoclave was evacuated to remove argon, 310 g of propylene and 0.7 Nl of hydrogen were charged. The temperature was raised to reach 70 ° C. in 5 minutes, and polymerization reaction was carried out at 70 ° C. for 2 hours. After cooling the autoclave, propylene was purged and the content of the autoclave was taken out, followed by drying under reduced pressure to obtain 88 g of polypropylene powder. The powder had a bulk density of 0 39 g/cm³, and contained fine particles (which is defined as a particle size of 100 μm or less) in an amount of 0.2% by weight. The powder had an excellent flowability. Further, the powder had an I.I. (the content of residual polymer after extraction with boiling n-heptane) of 96.5%. Fluorescent X ray spectral analysis indicated that the polymer contains 12.0 ppm of chlorine.

COMPARATIVE EXAMPLE 1

The same procedures as in Example 1 were repeated except that silicon dioxide not treated with trimethyl-chlorosilane (hydroxyl group content: 3,7 μmol/m²) was used instead of the trimethyl-chlorosilane-treated silicon dioxide.

As a result, 9.9 g of polypropylene powder was obtained which had a bulk density of 0.37 g/cm³ and an I.I. of 95.8%. The content of chlorine in the polymer was 111 ppm.

EXAMPLE 2

The same procedures as in Example 1 were repeated except that n-butyl benzoate was replaced by 2.0 mmol of diisobutyl phthalate and methyl p-toluylate was replaced by 0.15 mmol of phenyl-triethoxysilane.

As a result, 165 g of polypropylene powder was obtained which had a bulk density of 0.41 g/cm.³ and an I.I. of 97.4%. The polymer contained 0.1% by weight of fine powders having a particle size of 100 m or less. The content of chlorine in the polymer was 6.4 ppm.

EXAMPLE 3

The same procedures as in Example 1 were repeated except that the silicon dioxide calcined at 500 ° C. was replaced by a calcined silicon dioxide prepared by calcining silicon dioxide as starting material at 800 ° C. for 5 hours so that the surface hydroxyl group concentration thereof was 1.8 μmol/m².

As a result, 18 g of polyproylene powder was obtained which had a bulk density of 0.39 g/cm³ and an I.I. of 96.5%. The polymer contained 0.0% by weight of fine powders having a particle size of 100μm or less. The content of chlorine in the polymer was 69 ppm.

EXAMPLE 4

(1) Preparation of Solid Catalyst Component

In the same manner as in Example 1, a solid component was obtained which had a surface hydroxyl group concentration of 0.3 μmol/m².

To the solid component (10 g) was added 50 ml of kerosene oil solution containing dried magnesium stearate (20 mmol), diethoxymagnesium (30 mmol) and tetra-n-butoxytitanium (30 mmol), and the mixture was allowed to stand at a temperature of 150 ° C. for 1 hour. Thereafter, 50 ml of isopropanol was added portionwise, followed by stirring at 80 ° C. for 1 hour. Decantation with 100 ml of n-heptane was repeated 3 times and the residue was dried under reduced pressure at 80 ° C. to obtain a white catalyst carrier. The catalyst carrier contained 3.5% by weight of magnesium atom.

Thus-obtained catalyst carrier (8.0 g) was charged in a 0.5 l glass reactor, and 50 ml of methylene chloride, 3.6 mmol of n-butyl benzoate, and 48 g of titanium tetrachloride. The resulting mixture was stirred for 1 hour under reflux. Then, the supernatant was removed by decantation and the solid portion was well washed with hot n-heptane to obtain a solid catalyst component, which contained 2.7% by weight of Ti.

(2) Polymerization of Propylene

In a 1 l autoclave purged with argon were charged 50 ml of hexane having suspended therein 0.006 mmol Ti of the solid catalyst component, 1.5 mmol of triethylaluminium and 0.45 mmol of methyl p-toluylate. After the autoclave was evacuated to remove argon, 310 g or propylene and 0.7 Nl of hydrogen were charged. The temperature was raised to reach 70 ° C. in 5 minutes, and polymerization reaction was carried out at 70 ° C. for 2 hours. After cooling the autoclave, propylene was purged and the content of the autoclave was taken out, followed by drying under reduced pressure to obtain 158 g of polypropylene powder. The powder had a bulk density of 0.39 g/cm³, and contained fine particles having a particle size of 100 μm or less in an amount of 0.1% by weight. The powder had an excellent flowability. Further, the powder had an I.I. of 96.7%. Fluorescent X ray spectral analysis indicated that the polymer contains 4.5 ppm of chlorine.

EXAMPLE 5

(1) Preparation of Solid Catalist Component

The same procedures as in Example 1 (1) were repeated except that ethyl benzoate was replaced by 2.0 mmol of diisobutyl phthalate.

In a 5l autoclave which had been purged with nitrogen gas sufficiently was charged 20 g of dried polypropylene powder, and then 7.5 mmol of triethylaluminium, 0.3 mmol of diphenyl-dimethoxysilane and 0.03 mg Ti were added thereto. After introducing hydrogen and then propylene, the temperature and pressure were raised to 70 ° C. and 28 kg/cm², respectively, and polymerization of propylene was carried out under these conditions for 2 hours. Thereafter, unused gases were evacuated. As a result, 550 g of polypropylene powder was obtained which had a bulk density of 0.40 g/cm³ and an I.I. of 98.0%. The polymer contained 0.1% by weight of fine powders having a particle size of 100 μm or less. The content of chlorine in the polymer was 9.6 ppm.

EXAMPLE 6

In a 10l autoclave provided with a stirrer which had been purged with nitrogen gas sufficiently were charged 5l of n-heptane, 15 mmol of triethylaluminium, 0.6 mmol of diphenyl-dimethoxysilane, and 0.06 mg Ti of the solid catalyst component prepared in Example 4 (1). The temperature of the liquid phase was maintained at 70 ° C., and hydrogen metered to such an amount that the resulting polypropylene had a predetermined intrinsic viscosity number and propylene in such an amount that the reaction pressure was 9 kg/cm² were continuously supplied to the autoclave, the reaction being continued for 2 hours with stirring.

After completion of polymerization reaction, unused gases were removed, and the catalyst was inactivated and removed, followed by drying. As a result, 559 g of white powder of polypropylene was obtained which had a bulk density of 0.39 g/cm³ and an I.I. of 97.8%. The polymer contained 0.3% by weight of fine powders having a particle size of 100 μm or less. The content of chlorine in the polymer was 19.0 ppm.

From the results in Examples 1 to 6 and Comparative Example 1, it can be seen that:

(1) The catalyst used in the present invention has a high catalytic activity which lasts for long period of time.

(2) Since the catalyst used has a high activity the polymerization reaction can be carried out under stabilized conditions.

(3) Polymerization reaction using the above-described catalyst gives rise to polyolefins which contain substantially no catalyst residue. Therefore, when the polyolefin is molded molding machines does not suffer corrosion and the surface of molded articles can be finished beautifully, resulting in that the molded articles having a high commercial value can be produced.

(4) Polymerization reacion using the above-described catalyst results in the production of polyolefins having a high stereoregularity.

(5) When the polymerization of an α-olefin is carried out using the above-described catalyst, the polyolefin produced contain substantially no fine polymer powder having a particle size of 100 μm or less. Therefore, powdery polyolefin can be transported smoothly without causing clogging of pipelines. Further, the polyolefin obtained has a high bulk density and as a result the polyolefin can be transported in the form of powder efficiently.

EXAMPLE 7

(1) Preparation of Solid Catalyst Component

To 12.0 g of calcined silicon dioxide (a product by Fuji Davison Co., Ltd., grade 952, specific surface area: 350 m$^2$/g, average particle size: 54 to 65 μm surface hydroxyl group concentration: 2.3 μmol/m$^2$) was added 60 ml of a n-heptane solution containing diethoxymagnesium (60 mmol) and tetra-n-butoxytitanium (35 mmol) and the mixture was allowed to react at room temperature for 1 hour. Thereafter, 30 ml of isopropanol was added portionwise, and the resulting mixture was stirred at 80° C. for 1 hour. Then, the reaction mixture was decanted three times using 100 ml of n-heptane and dried at 80° C. for 1 hour under reduced pressure to obtain a white catalyst carrier. The catalyst carrier contained 3.4% by weight of magnesium atom.

The thus-obtained catalyst carrier (10.0 g) was charged in a 0.5 l glass reactor, and 50 ml of 1,2-dichloroethane, 3.2 mmol of n-butyl benzoate, and 50 g of titanium tetrachloride were added thereto. The resulting mixture was stirred for 1 hour under reflux. Then, the supernatant was removed by decantation and the solid portion was well washed with hot n-heptane to obtain a solid catalyst component, which contained 4.9% by weight of Ti.

(2) Polymerization of Propylene

In a 1 l autoclave purged with argon were charged 50 mR of hexane having suspended therein 0.006 mmol Ti of the solid catalyst component, 1.5 mmol of triethylaluminium and 0.42 mmol of methyl p-toluylate. After the autoclave and 0.42 mmol of methyl p-toluylate. After the autoclave was evacuated to remove argon, 310 g of propylene and 0.7 Nl of hydrogen were charged. The temperature was raised to reach 70° C. in 5 minutes, and polymerization reaction was carried out at 70° C. for 2 hours. After cooling the autoclave, propylene was purged and the content of the autoclave was taken out, followed by drying reduced pressure to obtain 13.8 g of polypropylene powder. The powder had a bulk density of 0 38 g/cm$^3$ and contained fine particles having a particle size of 100 μm or less in an amount of 0.4% by weight. The powder had an excellent flowability. Further, the powder had an I.I. of 96.8%. Fluorescent X ray spectral analysis indicated that the polymer contains 102 ppm of chlorine.

EXAMPLE 8

The same procedures as in Example 7 were repeated except that the silicon dioxide was replaced by alumina (a product by Sumitomo Aluminium Co., Ltd., No. A-11, average particle size: 40 to 50 μm).

As a result, 14.5 g of polypropylene powder was obtained which had a bulk density of 0.28 §/cm$^3$ and an I.I. of 96.0%. The powder contained 1.0% by weight of fine powders having a particle size of 100 μm or less. The content of chlorine in the polymer was 100 ppm.

EXAMPLE 9

(1) Preparation of Solid Catalyst Component

In a 0.5l glass reactor purged with argon were charged 20 g of calcined silicon dioxide (a product by Fuji Davison Co., Ltd., grade 952, specific surface area: 350 m$^2$/g, average particle size: 54 to 65μm) and 100 ml of trimethyl-chlorosilane, and the mixture was allowed to react with stirring under reflux for 12 hours. Then, the reaction mixture was decanted three times using 200 ml of n-heptane and dried to obtain a solid component (surface hydroxyl group concentration: 0.25 μmol/m$^2$).

Subsequently, the same procedures as in Example 7 were repeated using thus-obtained solid component to obtain a solid catalyst component.

The catalyst carrier (the solid component in the solid catalyst) contained 3.5% by weight as magnesium atom of the magnesium compound, and the content as titanium atom of the titanium halide in the solid catalyst component was 2.3% by weight.

(2) Polymerization of Propylene

Propylene was polymerized in the same manner as in Example 7 using thus-obtained catalyst.

As a result, 121 g of polypropylene powder was obtained which had a bulk density of 0.40 g/cm$^3$ and an I.I. of 97.0%. The powder contained 1.0% by weight of fine powders having a particle size of 100 μm or less. The content of chlorine in the polymer was 10.1 ppm.

EXAMPLE 10

The same procedures as in Example 9 was repeated except that n-butyl benzoate was replaced by 2.0 mmol of diisobutyl phthalate and methyl p-toluylate was replaced by 0.15 mmol of phenyltriethoxysilane.

As a result, 245 g of polyproxylene powder was obtained which had a bulk density of 0.42 g/cm$^3$ and an I.I. of 97.4%. The polymer contained 0.4% by weight of fine powders having a particle size of 100 μm or less. The content of chlorine in the polymer was 5.3 ppm.

EXAMPLE 11

(1) Preparation of Solid Catalyst Component

To 10.0 g of calcined silicon dioxide (a product by Fuji Davison Co., Ltd., grade 952, specific surface area: 350 m$^2$/g, average particle size: 54 to 65μm surface hydroxyl group concentration: 2.4 μmol/m$^2$) was added 50 mR of kerosene oil solution containing dried magnesium stearate (20 mmol), diethoxymagnesium (30 mmol) and tetra-n-butoxytitanium (30 mmol), and the mixture was allowed to stand at a temperature of 150° C. for 1 hour. Thereafter, 50 ml of isopropanol was added portionwise, followed by stirring at 80° C. for 1 hour. Decantation with 100 ml of n-heptane was repeated 3 times and the residue was dried under reduced pressure at 80° C. to obtain a white catalyst carrier. The catalyst carrier contained 3.8% by weight of magnesium atom.

Thus-obtained catalyst carrier (8.0 g) was charged in a 0.5 l glass reactor, and 50 ml of methylene chloride, 3.6 mmol of n-butyl benzoate, and 48 g of titanium tetrachloride. The resulting mixture was stirred for 1 hour under reflux. Then, the supernatant was removed by decantation and the solid portion was well washed with hot n-heptane to obtain a solid catalyst component, which contained 2.9% by weight of Ti.

(2) Polymerization of Propylene

In a 1 l autoclave purged with argon were charged 50 ml of hexane having suspended therein 0.006 mmol Ti of the solid catalyst component, 1.5 mmol of triethylaluminium and 0.45 mmol of methyl p-toluylate. After the autoclave was evacuated to remove argon, 310 g of propylene and 0.7 Nl of hydrogen were charged. The temperature was raised to reach 70° C. in 5 minutes, and polymerization reaction was carried out at 70° C. for 2 hours. After cooling the autoclave, propylene was purged and the content of the autoclave was taken out, followed by drying reduced pressure to obtain 26.4 g of polypropylene powder. The powder had a bulk density of 0.37 g/cm$^3$, and contained fine particles having a particle size of 100 μm or less in an amount of 0.2% by weight. The powder had an excellent flowability. Further, the powder had an I.I. of 97%. Fluorescent X ray spectral analysis indicated that the polymer contains 40 ppm of chlorine.

From the results in Examples 7 to 11 and Comparative Example 1, it can be seen that the catalyst comprising a solid catalyst component (A) obtained by contacting (a) a solid component, (b) an electron donating compound and (c) a titanium halide, particularly in (d) a halogenated hydrocarbon solvent, had a high activity which lasted for long period of time. The polymerization method using this catalyst according to the present invention exhibits above-described benefit and advantage as described in (2) to (4) above.

EXAMPLE 12

(1) Preparation of Solid Catalyst Component

To 30.0 g of calcined silicon dioxide (a product by Fuji Davison Co., Ltd., grade 952, specific surface area: 350 m$^2$/g, average particle size: 54 to 65 μm surface hydroxyl group concentration: 2.5 μmol/m$^2$) were added 150 ml of n-heptane solution containing diethoxymagnesium (150 mmol) and tetra-n-butoxytitanium (90 mmol), and the mixture was allowed to stand at room temperature for 1 hour. Thereafter, 50 ml of isopropanol was added portionwise, followed by stirring at 80 ° C. for 1 hour. Decantation with 100 ml of n-heptane was repeated 5 times and the residue was dried under reduced pressure at 80 ° C to obtain a white catalyst carrier. The catalyst carrier contained 3.5% by weight of magnesium atom.

Thus-obtained catalyst carrier (7.0 g) was charged in a 0.5 l glass reactor, and 50 ml of n-heptane, 1.8 mmol of diisobutyl phthalate, and 45 g of titanium tetrachloride were charged. The resulting mixture was stirred for 1 hour under reflux. Then, the supernatant was removed by decantation and the solid portion was well washed with hot n-heptane to obtain a solid catalyst component, which contained 5.4% by weight of Ti.

(2) Polymerization of Propylene

In a 1 l autoclave purged with argon were charged 50 ml of hexane having suspended therein 0.006 mmol Ti of the solid catalyst component, 1.5 mmol of triethylaluminum and 0.45 mmol of methyl p-toluylate. After the autoclave was evacuated to remove argon, 310 g of propylene and 0.7 Nl of hydrogen were charged. The temperature was raised to reach 70° C. 5 minutes, and polymerization reaction was carried out at 70° C. for 2 hours. After cooling the autoclave, propylene was purged and the content of the autoclave taken out, followed by driving under reduced pressure to obtain 16.8 g of polypropylene powder. The powder had a bulk of 0.38 g/cm$^3$, and contained fine particles having a particle size of 100 μm or less in an amount of 0.3% by weight. The powder had an excellent flowability. Further, the powder had an I.I. of 96.8%. Fluorescent X ray spectral analysis indicated that the polymer contains 72 ppm of chlorine.

EXAMPLE 13

The same procedures as in Example 12 were repeated except that diisobutyl phthalate was replaced by dipropylphthalate. As a result, 16.5 g of polypropylene powder was obtained which had a bulk density of 0.39 g/cm$^3$ and an I.I. of 96.5%. The polymer contained 0.3% by weight of fine powders having a particle size of 100 μm or less. The content of chlorine in the polymer was 75 ppm.

EXAMPLE 14

The same procedures as in Example 12 were repeated except that the silicon dioxide was replaced by alumina (a product by Sumitomo Aluminium Co., Ltd., No. A-11, average particle size: 40 to 50 μm).

As a result, 17.2 g of polypropylene powder was obtained which had a bulk density of 0.27 g/cm$^3$ and an I.I. of 96.2%. The powder contained 1.0% by weight of fine powders having a particle size of 100 μm or less. The content of chlorine in the polymer was 68 ppm.

COMPARATIVE EXAMPLE 2

The same procedures as in Example 12 were repeated except that 1.8 mmol of diisobutyl phthalate was replaced by 3.2 mmol of n-butyl-phthalate. As a result, 10.2 g of powder was obtained which had an I.I. of 95.3%. Fluorescent X ray spectral analysis indicated that the content of chlorine in the polymer was 112 ppm.

EXAMPLE 15

(1) Preparation of Solid Catalyst Component

In a 0.5 l glass reactor purged with argon were charged 20 g of calcined silicon dioxide (a product by Fuji Davison Co., Ltd., grade 952, specific surface area: 350 m$^2$/g, average particle size: 54 to 65 μm) and 100 ml of trimethyl-chlorosilane, and the mixture was allowed to react with stirring under reflux for 12 hours. Then, the reaction mixture was decanted three times using 200 ml of n-heptane and dried to obtain a solid component (surface hydroxyl group concentration: 0.3 μmol/m$^2$).

Subsequently, the same procedures as in Example 12 were repeated using 10.0 g of thus-obtained solid component to obtain a solid catalyst component.

The catalyst carrier (the solid component in the solid catalyst) contained 3.1% bu weight as magnesium atom of the magnesium compound, and the content as titanium atom of the titanium halide in the solid catalyst component was 2.4% by weight.

(2) Polymerization of Propylene

Proprylene was polymerized in the same manner as in Example 12 using thus-obtained catalyst.

As a result, 126 g of polypropylene powder was obtained which had a bulk density of 0.40 g/cm$^3$ and an I.I. of 96.5%. The powder contained 0% by weight of fine powders having a particle size of 100 μm or less. The content of chlorine in the the polymer was 10.1 ppm.

COMPARATIVE EXAMPLE 3

The same procedures as in Examples 15 were repeated except that diisobutyl phthalate was replaced by 3.2 mmol of n-butyl benzoate. As a result, 82 g of polypropylene powder was obtained which had an I.I. of 95.2%. The content of chlorine in the polymer was 14.3 ppm.

From the results in Examples 12 to 15 and Comparative Examples 2 and 3, it can be seen that the catalyst comprising a solid catalyst component (A) obtained by contacting (a) a solid component, (b) an electron donating compound and (c) a titanium halide had a high activity which lasted for a long period of time.

EXAMPLE 16

(1) Preparation of Solid Catalyst Component

To 10.0 g of silicon dioxide (a product by Fuji Davison Co., Ltd., grade 952, specific surface area: 350 m$^2$/g, average particle size: 54 to 65 μm, surface hydroxyl group concentration: 2.0 μmol/m$^2$) was added 50 ml of n-heptane solution containing diethoxymagnesium (50 mmol) and tetra-n-butoxytitanium (30 mmol), and the mixture was allowed to react at room temperature for 1 hour. Thereafter, 25 ml of isopropanol was added portionwise, and the resulting mixture was stirred at 80° C., for 1 hour. Then, the reaction mixture was decanted three times using 100 ml of n-heptane and dried at 80° C. for 1 hour under reduced pressure to obtain a white catalyst carrier. The catalyst carrier contained 3.8% by weight of magnesium atom.

Thus-obtained catalyst carrier (7.5 g) was charged in a 0.5 l glass reactor, and 50 ml of n-heptane, 1.9 mmol of diisobutyl phthalate, and 45 g of titanium tetrachloride were added thereto. The resulting mixture was stirred for 1 hour under reflux. Then, the supernatant was removed by decantation and the solid portion was well washed with hot n-heptane to obtain a solid catalyst component, which contained 5.1% by weight of Ti.

(2) Polymerization of Propylene

In a 1 l autoclave purged with argon were charged 50 mR of hexane having suspended therein 0.006 mmol Ti of the solid catalyst component, 1.5 mmol of triethylaluminium and 0.15 mmol of phenyltriethoxysilane. After the autoclave was evacuated to remove argon, 310 g of propylene and 0.7 Nl of hydrogen were charged. The temperature was raised to reach 70° C. in 5 minutes, and polymerization reaction was carried out at 70° C. for 2 hours. After cooling the autoclave, propylene was purged and the content of the autoclave was taken out, followed by drying under reduced pressure to obtain 20.2 g of polypropylene powder. The powder had a bulk density of 0 40 g/cm$^3$ and contained fine particles having a particle size of 100 μm or less in an amount of 0.2% by weight. The powder had an excellent flowability. Further, the powder had an I.I. of 96.8%. The molecular weight distribution (Mw/Mn) determined by gel permeation chromatography (GPC) was 4.2. Fluorescent X ray analysis indicated that the polymer contains 61 ppm of chlorine.

EXAMPLE 17

The same procedures as in Example 16 were repeated except that diisobutyl phthalate was replaced by dipropyl phthalate. As a result, 19.8 g of polypropylene powder was obtained which had a bulk density of 0.40 g/cm$^3$ and an I.I. of 97.1%. The powder contained 0.2% by weight of fine powders having a particle size of 100 μm or less. The molecular weight distribution (Mw/Mn) determined by GPC was 3.8. The content of chlorine in the polymer was 70 ppm.

EXAMPLE 18

The same procedures as in Example 16 were repeated except that phenyltriethoxysilane was replaced by diphenyl-dimethoxylane. As a result, 21.3 g of polypropylene powder was obtained which had a bulk density of 0.40 g/cm$^3$ and an I.I. of 97.2%. The powder contained 0.4% by weight of fine powders having a particle size of 100 μm or less. The molecular weight distribution (Mw/Mn) of the polypropylene determined by GPC was 4.2. The content of chlorine in the polymer was 62 ppm.

EXAMPLE 19

The same procedures as in Example 16 were repeated except that the silicon dioxide was replaced by alumina (a product by Sumitomo Aluminium Co., Ldt., No. A-11, average particle size.: 40 to 50 μm). As a result, 21.5 g of polypropylene powder was obtained which had a bulk density of 0.28 g/cm$^3$ and an I.I. of 97.0%. The powder contained 1.2% by weight of fine powders having a particle size of 100 μm or less. The molecular weight distribution (Mw/Mn) of the polypropylene determined by GPC was 4.1. The content of chlorine in the polymer was 69 ppm.

COMPARATIVE EXAMPLE 4

The same procedures as in Example 16 were repeated except that 1.9 mmol of diisobutyl phthalate was replaced by 3.4 mmol of n-butyl benzoate, and 0.15 mmol of phenyltriethoxysilane was replaced by 0.4 mmol of methyl p-toluylate. As a result, 9.8 g of polypropylene powder was obtained which had a bulk density of 0.36 g/cm$^3$ and an I.I. of 95.0%. The powder contained 0.5% by weight of fine powders having a particle size of 100 μm or less. The molecular weight distribution (Mw/Mn) of the polypropylene determined by GPC was 7.8. The content of chlorine in the polymer was 148 ppm.

EXAMPLE 20

(1) Preparation of Solid Catalyst Component

In a 0.5 l glass reactor purged with argon were charged 20 g of calcined silicon dioxide (a product by Fuji Davison Co., Ltd., grade 952, specific surface area: 350 m$^2$/g, average particle size: 54 to 65 μm) and 100 ml of trimethyl-chlorosilane, and the mixture was allowed to react with stirring under reflux for 12 hours. Then, the reaction mixture was decanted three times using 200 ml of n-heptane and dried to obtain a solid component (surface hydroxyl group concentration: 0.3 lmol/m$^2$).

Subsequently, the same procedures as in Example 16 were repeated using the thus-obtained solid component to obtain a solid catalyst component.

The catalyst carrier (the solid component in the solid catalyst) contained 3.2% by weight as magnesium atom of the magnesium compound, and the content as titanium atom of the titanium halide in the solid catalyst component was 2.4% by weight.

(2) Polymerization of Propylene

Propylene was polymerized in the same manner as in Example 16 using the thus-obtained catalyst. As a result, 175 g of propylene powder was obtained which had a bulk density of 0.40 g/cm³ and an I.I. of 97.2%. The powder containing 0.3% by weight of fine powders having a particle size of 100 μm or less. The content of chlorine in the polymer was 7.2 ppm. The molecular weight distribution (Mw/Mn) of the polypropylene determined by GPC was 3.9.

COMPARATIVE EXAMPLE 5

The same procedures as in Example 16 were repeated except that 1.9 mmol of diisobutyl phthalate was replaced by 3.4 mmol of ethyl benzoate, and 0.15 mmol of phenyltriethoxysilane was replaced by 0.4 mmol of methyl p-toluylate. As a result, 81 g of polypropylene powder was obtained which had an I.I. of 95.4%. The content of chlorine in the polymer was 16.2 ppm. The molecular weight distribution (Mw/Mn) of the polypropylene determined by GPC was 8.1.

EXAMPLE 21

(1) Preparation of Solid Catalyst Component

To 10.0 g of calcined silicon dioxide (a product by Fuji Davison Co., Ltd., grade 952, specific surface area: 350 m²/g, average particle size: 54 to 65 μm, surface hydroxyl group concentration: 2.1 μmol/m²) was added 50 ml of a n-heptane solution containing diethoxymagnesium (50 mmol) and tetra-n-butoxytitanium (30 mmol) and the mixture was allowed to react at room temperature for 1 hour. Thereafter, 25 ml of isopropanol was added portionwise, and the resulting mixture was stirred at 80° C. for 1 hour. Then, the reaction mixture was decanted three times using 100 ml of n-heptane and dried at 80° C. for 1 hour under reduced pressure to obtain a white catalyst carrier. The catalyst carrier contained 3.1% by weight of magnesium atom.

Thus-obtained catalyst carrier (8.0 g) was charged in a 0.5 l glass reactor, and 50 ml of n-heptane, 3.6 mmol of n-butyl benzoate, and 40 g of titanium tetrachloride. The resulting mixture was stirred for 1 hour under reflux. Then, the supernatant was removed by decantation and the solid portion was well washed with hot n-heptane to obtain a solid catalyst component, which contained 5.6% by weight of Ti.

(2) Polymerization of Propylene

In a 1 l autoclave purged with argon were charged 50 ml of hexane suspended therein 0.006 mmol Ti of the solid catalyst component, 1.5 mmol of triethylaluminium and 0.15 mmol of phenyltriethoxysilane. After the autoclave was evacuated to remove argon, 310 g of propylene and 0.7 Nl of hydrogen were charged. The temperature was raised to reach 70° C. in 5 minutes, and polymerization reaction was carried out at 70° C. for 2 hours. After cooling the autoclave, propylene was purged and the content of the autoclave was taken out, followed by drying under reduced pressure to obtain 16.3 g of polypropylene powder. The powder had an MI of 2.0 g/10 min. and a bulk density of 0.37 g/cm³, and contained fine particles having a particle size of 100 μm or less in an amount of 0.1% by weight.

The powder had an excellent flowability. Further, the powder had an I.I. of 96.7%. Fluorescent X ray spectral analysis indicated that the polymer contains 67 ppm of chlorine. The Mw/Mn of the polypropylene determined by GPC was 3.9.

EXAMPLE 22

The same procedures as in Example 21 were repeated except that phenyltriethoxysilane was replaced by diphenyldimethoxysilane. As a result, 15.5 of polypropylene powder was obtained which had an MI of 2.2 g/10 min. and a bulk density of 0.37 g/cm³. The powder contained 0.2% by weight of fine powders having a particle size of 100 μm or less and had an I.I. of 97%.

The Mw/Mn of the polymer determined by GPC was 4.2. The content of chlorine in the polymer was 73 ppm.

EXAMPLE 23

The same procedures as in Example 21 were repeated except that the silicon dioxide was replaced by alumina (a product by Sumitomo Aluminium Co., Ltd., A-11, average particle size: 40 to 50 μm). As a result, 17.8 g of polypropylene powder was obtained which had an MI of 2.0 g/10 min. and a bulk density of 0.29 g/cm³ and an I.I. of 96.5%. The powder contained 0.9% by weight of fine powders of fine powders having a particle size of 100 μm or less. The Mw/Mn of the polypropylene determined by GPC was 3.9. The content of chlorine in the polymer was 60 ppm.

COMPARATIVE EXAMPLE 6

The same procedures as in Example 21 were repeated except that 0.15 mmol of phenyltriethoxysilane was replaced by 0.4 mmol of methyl p-toluylate. As a result, 11.7 g of polypropylene powder was obtained which had an I.I. of 95.8% and an MI of 2.0 g/10 min. The Mw/Mn of the polymer determined by GPC was as high as 7.9. The content of chlorine in the polymer determined by fluorescent X ray spectral analysis was 94 ppm.

EXAMPLE 24

(1) Preparation of Solid Catalyst Component

In a 0.5 l glass reactor purged with argon were charged 20 g of calcined silicon dioxide (a product by Fuji Davison Co., Ltd., grade 952, specific surface area: 350 m²/g, average particle size: 54 to 65 μm) and 100 ml of trimethyl-chlorosilane, and the mixture was allowed to react with stirring under reflux for 12 hours. Then, the reaction mixture was decanted three times using 200 ml of n-heptane and dried to obtain a solid component (surface hydroxyl group concentration: 2.3 μmol/m²).

Subsequently, the same procedures as in Example 21 were repeated using thus-obtained solid component to obtain a solid catalyst component.

The catalyst carrier (the solid component in the solid catalyst) contained 3.2% by weight as magnesium atom of the magnesium compound, and the content as titanium atom of the titanium halide in the solid catalyst component was 2.2% by weight.

(2) Polymerization of Propylene

Propylene was polymerized in the same manner as in Example 21 using the thus-obtained catalyst.

As a result, 128 g of polypropylene powder was obtained which had a bulk density of 0.41 g/cm³. The powder contained 0.1% by weight of fine powders having a particle size of 100 μm or less. The polypropylene had an I.I. of 96.8% and an MI of 2.1 g/10 min. The Mw/Mn determined by GPC was 3.9. The content of chlorine in the polymer determined by fluorescent X ray spectral analysis was 9.1 ppm.

COMPARATIVE EXAMPLE 7

The same procedures as in Example 20 were repeated except that 0.15 mmol of phenyltriethoxysilane was replaced by 0.4 mmol of methyl p-toluylate. As a result, 86 g of polypropylene powder was obtained which had an I.I. of 95.8% and an MI of 2.2 g/10 min. The Mw/Mn of the polymer determined by GPC was as high as 8.1. The content of chlorine in the polymer determined by fluorescent X ray spectral analysis was 12.5 ppm.

From results in Examples 16≠20, 21≠24 and Comparative Examples 4, 5, 6 and 7, it can be seen that a catalyst comprising a solid catalyst component (A) obtained by contacting a solid component (a), an electron donating compound (b), particularly an aromatic carboxylic acid ester and/or aromatic dicarboxylic acid ester, and a titanium halide (c), an organic aluminium compound (B) and an organic silane compound (C) has a high catalytic activity which lasts for a long period of time, and that the polymerization method using this highly active catalyst is advantageous in that not only it can exhibit benefit and advantage described in (2) to (4) hereinabove but also it can produce polyolefins having a narrow molecular weight distribution.

EXAMPLE 25

(1) Preparation of Catalyst Carrier

In a 0.5 l glass reactor purged with argon were charged 20 g of calcined silicon dioxide (a product by Fuji Davison Co., Ltd., grade 952, specific surface area: 350 m²/g, average particle size: 54 to 65 μm), 40 ml of dimethyl-dichlorosilane and 100 ml of n-heptane, and the mixture was allowed to react with stirring under reflux for 5 hours. Then, the reaction mixture was decanted three times using 100 ml of n-heptane. Thereafter, 100 ml of methanol was added and the mixture was allowed to react under reflux for 1 hour. The reaction mixture was washed once by decantation with 100 ml of methanol and dried at 100° C. for 1 hour to obtain a solid component (surface hydroxyl group concentration: 0.5 μmol).

To 5.0 g of the above solid component was added 7.0 ml of a tetra-n-butoxytitanium solution of 4.5 g of diethoxymagnesium, and the resulting mixture was left to stand at room temperature for 30 minutes. Thereafter, 20 ml of tetrachlorosilane was added portionwise in 1 hour. The resulting mixture was stirred at 80° C. for 1 hour, and then decantation with 10 ml of n-heptane was repeated 3 times. After decantation was completed, the reaction mixture was evacuated and dried at 80° C. for 1 hour to obtain a white solid catalyst carrier, for polymerization of olefins. This catalyst carrier contained 4.6% by weight of magnesium atom.

(2) Preparation of Solid Catalyst Component for Polymerization of Olefins

Thus-obtained catalyst carrier (5.5 g) was charged in a 0.5 glass reactor, and 50 ml of n-heptane, 3.0 mmol of n-butyl benzoate, and 35 g of titanium tetrachloride. The resulting mixture was stirred for 1 hour under reflux. Then, the supernatant was removed by decantation and the solid portion was well washed with the hot n-heptane to obtain a solid catalyst component for polymerization of olefins.

(3) Polymerization of Propylene

In a 1 l autoclave purged with argon were charged 30 ml of hexane suspended therein 0.01 mmol Ti of the solid catalyst component, 1.0 mmol of triethylaluminium and 0.40 mmol of methyl p-toluylate. After the autoclave was evacuated to remove argon, 310 g of propylene and 0.7 Nl of hydrogen were charged. The temperature was raised to reach 70° C. in 5 minutes, and polymerization reaction was carried out at 70° C. for 2 hours. After cooling the autoclave, propylene was purged and the content of the autoclave was taken out, followed by drying under reduced pressure to obtain 143 g of polypropylene powder. The I.I. catalytic activity per Ti and bulk density of the polypropylene powder obtained are shown in Table 1 hereinbelow.

EXAMPLES 26 TO 29

The same procedures as in Example 25 were repeated except that the kinds of the silicon halides and of the alcohols were changed to those as shown in Table 1.

The I.I. catalytic activity per Ti atom and bulk density of the polypropylene powder obtained are shown in Table 1 hereinbelow.

COMPARATIVE EXAMPLE 8

The same procedures as in Example 25 were repeated except that no alcohol treatment was carried out. The results obtained are shown in Table 1 hereinbelow.

COMPARATIVE EXAMPLE 9

The same procedure as in Example 25 were repeated except that in the preparation of the catalyst carrier for polymerization of olefins the magnesium alkoxide was added directly without carrying out washing, drying and separation, after the treatment with methanol.

The results obtained are shown in Table 1 hereinbelow.

TABLE 1

|  | Silicone Halide | Alcohol | Activity Kg-pp/g-Ti | I.I. % | Bulk Density g/cm² |
|---|---|---|---|---|---|
| Ex. 25 | Dimethyldichlrosilane | Methanol | 298 | 96.0 | 0.40 |
| Ex. 26 | Dimethyldichlrosilane | Methanol | 284 | 96.3 | 0.39 |
| Ex. 27 | Dimethyldichlrosilane | Ethanol | 292 | 96.1 | 0.39 |
| Ex. 28 | Methyltrichlorosilane | Methanol | 289 | 96.0 | 0.41 |
| Ex. 29 | Tetrachlorosilane | Methanol | 294 | 95.6 | 0.34 |
| C. Ex. 8 | Demethyldichlorosilane | Not treated | 42 | 95.6 | 0.34 |
| C. Ex. 9 | Demethyldichlorosilane | Methanol | trace | — | — |

EXAMPLE 30

(1) Preparation of Catalyst Carrier for Polymerization of Olefin

In a 0.5 l glass reactor purged with argon were charged 10 g of calcined silicon dioxide (a product by Fuji Davison Co., Ltd., grade 952, specific surface area: 350 m²/g, average particle size: 54 to 65 μm), 10 ml of dimethyl-dichlorosilane and 50 ml of n-heptane, and the mixture was allowed to react with stirring under reflux for 5 hours. Then, the reaction mixture was decanted three times using 100 ml of n-heptane. Thereafter, 50 ml of methanol was added and the mixture was allowed to react under reflux for 2 hours. The reaction mixture was washed once by decantation with 100 ml of methanol and dried at 100° C. for 2 hours to obtain a component (A). To 5.0 g of the above component (A) (surface hydroxyl group concentration: 0.45μmol/m² was added 7.0 l of a tetra-n-butoxytitanium solution of 3.0 g of diethoxymagnesium, and the resulting mixture was left to stand at room temperature for 1 hour. Thereafter, 20 ml of ethyl alcohol ws added portionwise in 30 minutes. The resulting mixture was stirred at 80° C. for 1 hour, and then decantation with 100 ml of n-heptane was repeated 3 times. After decantation was completed, the reaction mixture was evacuated and dried at 80° C for 1 hour to obtain a white solid catalyst carrier, for polymerization of olefins. This catalyst carrier contained 4.2% by weight of magnesium atom.

(2) Preparation of Solid Catalyst Component for Polymerization/of/Olefins

Thus-obtained catalyst carrier (5.3 g) was charged in a 0.5 l glass reactor, and 50 ml of n-heptane, 3.0 mmol of n-butyl benzoate, and 35 g of titanium tetrachloride. The resulting mixture was stirred for 1 hour under relux. Then, the supernatant was removed by decantation and the solid portion was well washed with hot n-heptane to obtain a solid catalyst component for polymerization of olefins.

The Ti content in the catalyst for the polymerization of olefins was 118.2 mg.

(3) Polymerization of Propylene

In a 1 l autoclave purged with argon were charged 30 ml of hexane having suspended therein 0.01 mmol Ti of the solid catalyst component, 1.0 mmol of triethylaluminium and 0.40 mmol of methyl p-toluylate. After the autoclave was evacuated to remove argon, 310 g of propylene and 0.7 Nl of hydrogen were charged. The temperature was raised to reach 70° C. in 5 minutes, and polymerization reaction was carried out at 70° C. for 2 hours. After cooling the autoclave, propylene was purged and the content of the autoclave was taken out, followed by drying under reduced pressure to obtain 160 g of polypropylene powder. The I.I., catalytic activity per Ti atom and bulk density of the polypropylene powder obtained are shown in Table 1 hereinbelow.

EXAMPLES 31 AND 32

The same procedures as in Example 30 were repeated except that the kind of the alcohol as a depositing agent was changed to those as shown in Table 2 hereinbelow.

The I.I., catalytic activity per Ti atom and bulk density of the polypropylene powder obtained are shown in Table 2 hereinbelow.

COMPARATIVE EXAMPLE 10

The same procedures as in Example 30 were repeated except that no depositing agent was added.

The results obtained are shown in Table 2 hereinbelow.

COMPARATIVE EXAMPLE 11

The same procedures as in Example 30 were repeated except that no depositing agent was added and that the solvent was distilled off under reduced pressure.

The results obtained are shown in Table 2 hereinbelow.

TABLE 2

| | Depositing Agent | Polymerization Activity (Kg-PP/g-Ti) | I.I. (%) | Fine[1] Powder (wt %) |
|---|---|---|---|---|
| Ex. 30 | Ethanol | 334 | 96.5 | 0.1 |
| Ex. 31 | n-Propanol | 326 | 97.0 | 0.1 |
| Ex. 32 | i-Propanol | 318 | 96.8 | 0.2 |
| C. Ex. 10 | None | 157 | 96.5 | 42 |
| C. Ex. 11 | Distillation[1] | 177 | 96.0 | 38 |

Notes:
[1]Fine powder having a particle size of 100 μm or less.
[2]Solvent was removed by distillation under reduced pressure.

As will be apparent from the results in Examples 25~31 and Comparative Examples 8~11, when a carrier for the catalyst for use in the method of the present invention is used which is prepared by pretreating at least one oxide selected from the group consisting of oxides of elements belonging to Groups II, III, and IV of the periodic table and/or a composite inorganic oxide containing at least one such oxide with a silicon halide and with alcohol in this order, the amount of Ti metal supported on the carrier that is toxicated can be minimized. On the other hand, when the above-described oxide and/or composite inorganic oxide with or without the above-described pretreatment, at least one member selected from the group consisting of a hydrocarbon, an electron donating compound and an alkoxytitanium, and a mixture containing a magnesium alkoxide are mixed and further a depositing agent selected from the group consisting of an alcohol and a halogen-containing compound, particularly a halosilane, is added thereto, the magnesium alkoxide can be deposited on the carrier sufficiently, thus giving rise to a carrier suitable for a high activity catalyst for use in the polymerization of olefins.

EXAMPLE 33

(1) Preparation of Catalyst Carrier for Polymerization of Olefin

In a 0.5 l glass reactor purged with argon were charged 35 g of calcined silicon dioxide (a product by Fuji Davison Co., Ltd., grade 952, specific surface area: 350 m²/g, average particle size: 54 to 65 μm), and 175 l of trimethyl-chlorosiane, and the mixture was allowed to react with stirring under reflux for 12 hours. Then, the reaction mixture was decanted three times using 100 ml of n-heptane and then solid component (surface hydroxyl group concentration: 0.3 μmol/m²) was obtained.

To the above solid component was added n-heptane solution containing 150 mmol of diethoxymagnesium and 50 mmol of tetra-n-butoxytitanium and the resulting mixture was left to stand at room temperature for 1 hour. Thereafter, 50 ml of isopropanol was added portionwise. The resulting mixture was stirred at 80° C. for 1 hour, and then decantation with 100 ml of n-heptane was repeated 5 times. After decantation was completed, the reaction mixture was evacuated and dried at 80° C. for 1 hour to obtain a white solid catalyst carrier for polymerization of olefins. This catalyst carrier contained 3.1% by weight of magnesium atom.

(2) Preparation of Solid Catalyst Component for Polymerization/of/Olefins

Thus-obtained catalyst carrier (8.0 g) was charged in a 0.5 l glass reactor, and 50 ml of n-heptane, 3.6 mmol of ethyl benzoate, and 40 g of titanium tetrachloride. The resulting mixture was stirred for 1 hour under relux.

Then, the supernatant was removed by decantation and the solid portion was well washed with hot n-heptane to obtain a solid catalyst component for polymerization of olefins.

The Ti content in the catalyst for the polymerization of olefins was 2.4% by weight.

(3) Polymerization of Propylene

In a 1 l autoclave purged with argon were charged 50 ml of hexane having suspended therein 0.06 mmol Ti of the solid catalyst component, 1.5 mmol of triisobutyl-aluminium and 0.45 mmol of methyl p-toluylate. After the autoclave was evacuated to remove argon, 310 g of propylene and 0.7 Nl of hydrogen were charged. The temperature was raised to reach 70 ° C. in 5 minutes, and polymerization reaction was carried out at 70 ° C. for 2 hours. After cooling the autoclave, propylene was purged and the content of the autoclave was taken out, followed by drying under reduced pressure to obtain 99 g of polypropylene powder. The powder had an I.I. of 97.3% by weight and a bulk density of 0.38 g/cm$^3$. The polypropylene powder contained 0.1% by weight of fine powders having a particle size of 100 μm or less.

COMPARATIVE EXAMPLE 12

The same procedures as in Example 33 were repeated except that no trimethylchlorosilane was used to prepare a catalyst carrier (surface hydroxyl group concentration: 5.5 μmol/m$^2$) for polymerization of olefins. Then, a solid catalyst component and a catalyst were prepared in the same manner as in Example 33, and polymerization of propylene was carried out.

The amount of the polypropylene powder was 9.1 g. The polymer had an I.I. of 97.0%.

COMPARATIVE EXAMPLE 13

The same procedures as in Example 33 were repeated except that trimethylchlorosilane was replaced by methyltrichlorosilane and diethoxymagnesium was replaced by butylethylmagnesium. As a result, 48 g of propylene powder was obtained which had a bulk density of 0.35 g/cm$^3$ and contained 0.3% by weight of fine powders having a particle size of 100 μm or less. The polymer had an I.I. of 95.8%.

EXAMPLE 34

The same procedures as in Example 33 were repeated except that the kind of the alcohol as a depositing agent was changed from isopropanol to ethanol. As a result, 103 g of polypropylene powder was obtained which had a bulk density of 0.38 g/cm$^3$ and contained 0% by weight of fine powders having a particle size of 100 μm or less. The polymer had an I.I. of 97.3

COMPARATIVE EXAMPLE 14

The same procedures as in Example 33 were repeated except that isopropanol, a depositing agent, was not used and n-heptane was distilled off under reduced pressure. As a result, 72 g of polypropylene powder was obtained which had a bulk density of 0.25 g/cm$^3$. The powder contained 25% by weight of fine powders having a particle size of 100 μm or less. The polymer had an I.I. of 96.8%.

EXAMPLE 35

(1) Preparation of Catalyst

The catalyst carrier (8.0 g) prepared in Example 33 (1) was charged in a 0.5 l glass reactor, and 50 ml of n-heptane, 3.6 mmol of n-butyl benzoate, and 40 g of titanium tetrachloride. The resulting mixture was stirred for 1 hour under reflux. Then, the supernatant was removed by decantation and the solid portion was well washed with hot n-heptane to obtain a solid catalyst component for polymerization of olefins. The Ti content in the catalyst component was 2.2% by weight.

(3) Polymerization of Propylene

In a 1 l autoclave purged with argon were charged 50 ml of hexane having suspended therein 0.006 mmol Ti of the solid catalyst component, 1.5 mmol of triethylaluminium and 0.45 mmol of methyl p-toluylate. After the autoclave was evacuated to remove argon, 310 g of propylene and 0.7 Nl of hydrogen were charged. The temperature was raised to reach 70 ° C. in 5 minutes, and polymerization reaction was carried out at 70 ° C. for 2 hours. After cooling the autoclave, propylene was purged and the content of the autoclave was taken out, followed by drying under reduced pressure to obtain 101 g of polypropylene powder. The powder had a bulk density of 0.38 g/cm$^3$ and contained 0.4% by weight of fine powders having a particle size of 100 μm or less, thus showing an excellent flowability. The powder had an I.I. of 96.2% by weight. Fluorescent X ray spectral analysis of the polymer indicated that the chlorine content of the polymer was 16 ppm.

COMPARATIVE EXAMPLE 15

The same procedures as in Example 35 were repeated except that in Example 35 (1) reaction with trimethylchlorosilane was omitted and the amount of the solid catalyst component in Example 35 (2) was varied to 0.012 mmol Ti. As a result, 17.3 g of polypropylene powder was obtained which had an I.I. of 95.9%. Fluorescent X ray spectral analysis indicated that the chlorine content in the polymer was 195 ppm.

COMPARATIVE EXAMPLE 16

The same procedures as in Example 35 were repeated except that in Example 35 (1) trimethylchlorosilane was replaced by methyltrichlorosilane and diethoxymagnesium was replaced by butylethylmagnesium. As a result, 45 g of polypropylene powder which had an I.I. of 96.3% was obtained. Fluorescent X ray spectral analysis indicated that the content of chlorine in the polymer was 33 ppm.

EXAMPLE 36

The same procedures as in Example 35 were repeated except that isopropanol in Example 35 (1), a depositing agent, was replaced by ethanol. As a result, 105 g of polypropylene powder was obtained which had a bulk density of 0.38 g/cm$^3$ and contained 0.3% by weight of fine powders having a particle size of 100 μm or less. The polymer had an I.I. of 97.0%. Fluorescent X ray spectral analysis indicated that the content of chlorine in the polymer was 16 ppm.

COMPARATIVE EXAMPLE 17

The same procedures as in Example 35 were repeated except that isopropanol in Example 35 (1), a depositing agent was no used, and n-heptane were distilled off under reduced pressure. As a result, 75 g of polypropylene powder was obtained which had a bulk density of 0.29 g/cm$^3$ and contained 25% by weight of fine powders having a particle size of 100 μm or less. The polymer had an I.I. of 96.9%. Fluorescent X ray spectral analysis indicated that the content of chlorine in the polymer was 25 ppm.

EXAMPLE 37

The same procedures as in Example 35 were repeated except that n-butyl benzoate in Example 35 (1) was replaced by 2.0 mmol of diisobutyl phthalate and methyl p-toluylate in Example 35 (2) was replaced by 0.15 mmol if triethoxysilane. As a result, 212 g of polypropylene powder was obtained which had a bulk density of 0.42 g/cm$^3$ and contained 0.3% of fine powders having a particle size of 100 μm or less. The polymer had an I.I. of 97.5%. Fluorescent X ray spectral analysis indicated that the content of chlorine in the polymer was 8 ppm.

From the results in Examples 33~37 and Comparative Examples 12~17, it can be seen that when a carrier is used which is prepared by pretreating at least one oxide selected from the group consisting of oxides of elements belonging to Groups II, III and IV of the periodic table and/or a composite inorganic oxide containing at least one such oxide with an organic silane compound represented by formula $$R_3SiX$$

wherein R represents an alkyl group, a phenyl group or a vinyl group, and X represents a group capable of reacting with a hydroxyl group present on the surface of the at least one oxide and/or the composite inorganic oxide, and contacting the thus-obtained oxide and/or the composite inorganic oxide with the mixture containing a magnesium alkoxide, and further adding the depositing agent thereto so that the magnesium alkoxide can be deposited on the carrier sufficiently, then a polyolefin can be obtained which has in addition to the above-described benefits and advantage that it has a narrow particle size distribution.

EXAMPLE 38

(1) Preparation of Solid Catalyst Component

In a 1 l glass reactor purged with argon were charged 100 g of calcined silicon dioxide (a product by Fuji Davison Go., Ltd., grade 952, specific surface area: 350 m$^2$/g, average particle size: 54 to 65 μm), and 300 ml of trimethyl-chlorosilane, and the mixture was allowed to react with stirring under reflux for 12 hours. Then, the reaction mixture was decanted three times using 200 ml of n-heptane and dried to obtain a solid component of silicon dioxide which had a hydroxyl group concentration in trimethylchlorosilane of 0.3 μmol/m$^2$ determined in the same manner as in Example 1.

To the solid component (20.0 g) was added 100 ml of n-heptane solution containing diethoxymagnesium (100 mmol) and tetra-n-butoxytitanium (60 mmol), and the mixture was allowed to stand at room temperature for 1 hour. Thereafter, 55 ml of isopropanol was added portionwise, followed by stirring at 80° C. for 1 hour. Decantation with 200 ml of n-heptane was repeated 3 times and the residue was dried under reduced pressure at 80° C. for 1 hour to obtain a white catalyst carrier. The catalyst carrier contained 3.3% by weight of magnesium atom.

Thus-obtained catalyst carrier (11.0 g) was charged in an 0.5 l glass reactor, and 50 ml of n-heptane, 3.2 mmol of diisobutyl phthalate and 50 g of titanium tetrachloride.

The resulting mixture was stirred for 2 hours at 90° C. Then, the supernatant was removed by decantation and the solid portion was well washed by hot n-heptane to obtain a solid catalyst component, which contained 2.3% by weight of Ti.

(2) Polymerization of Propylene

In a 5 l autoclave which have been purged with nitrogen gas sufficiently was charged 20 g of dried polypropylene powder, and then 7.5 mmol of triethylalunimium, 0.3 mmol of diphenyl-dimethoxysilane and 0.03 mmol Ti of the solid catalyst component were added thereto. After introducing hydrogen and then propylene, the temperature and pressure were raised to 70° C. and 28 kg/cm$^2$, respectively, and polymerization of propylene was carried out under these conditions for 2 hours (first stage polymerization). The polypropylene prepared under the same conditions had an I.I. of 97.4% and [η](135° C., tetralin solution) was 1.77 dl/g.

After completion of polymerization, unused gases were evacuated. Thereafter, a mixed gas of ethylene and propylene (ethylene/propylene=50/50 (mol/mol)) and hydrogen were introduced, and while maintaining the pressure to 25 Kg/cm$^2$ with the mixed gas, the second stage polymerization was carried out at 60° C. for 2 hours.

After completion of polymerization, unused gases were evacuated. As a result, 853 g of propylene polymer was obtained. The ratio of propylene in the propylene polymer finally obtained calculated from the amount of the mixed gas consumed and the total amount of polymer was 32% by weight. On the other hand, the content of ethylene in the total polymer calculated from the data of infrared spectral analysis, was 14.4% by weight. Therefore, the content of ethylene in the polypropylene copolymer is 45% by weight.

The above-described propylene polymer was subjected to determination of a Melt Index (MI, JIS K72110), a modulus in tension (JIS K6758), Izod impact strength at −20° C. (JIS K7110, notched). The results obtained are shown in Table 3 hereinbelow.

EXAMPLES 39 TO 42 AND COMPARATIVE EXAMPLES 18 and 19

The same procedures as in Example 40 were repeated except that the rate of hydrogen of monomer gas to be supplied, and period of polymerization reaction were changed as shown in Table 3.

EXAMPLE 43

TO 20.0 g of the same solid component as that prepared in Example 38 (1) was added 100 ml of kerosene oil solution containing dried magnesium sterate (40 mmol), diethoxymagnesium (40 mmol) and tetra-n-butoxytitanium (60 mmol), and the mixture was allowed to stand at a temperature of 150° C. for 1 hour. Thereafter, 100 ml of isopropanol was added portionwise, followed by stirring at 80° C. for 1 hour. Decantation with 100 mR of n-heptane was repeated 5 times and the residue was dried under reduced pressure at 80° C. for 1 hour to obtain a white catalyst carrier. The catalyst carrier contained 3.5% by weight of magnesium atom.

Thus-obtained catalyst carrier (11.0 g) was charged in a 0.5 l glass reactor, and 50 l of n-heptane, 3.2 mmol of diisobutyl phthalate, and 50 g of titanium tetrachloride. The resulting mixture was stirred for 1 hour under reflux. Then, the supernatant was removed by decantation and the solid portion was well washed with hot n-heptane to obtain a solid catalyst component, which contained 2.3% by weight of Ti.

Polimerization of propylene was carried out in the same manner as in Example 38 except that the solid catalyst thus-obtained was used.

The results obtained are shown in Table 3 hereinbelow.

EXAMPLE 44

The type of polymerization reaction used in this example was a slurry polymerization method.

In a 10 l autoclave provided with a stirrer which had been purged with nitrogen sufficiently, were charged 5 l In the same manner as in Example 38 (2), vapor phase polymerization was carried out using the catalyst thus-obtained.

The results obtained are shown in Table 3 hereinbelow.

COMPARATIVE EXAMPLE 21

Using the same solid catalyst component as in Comparative Example 20, a slurry polymerization was carried out in the same manner as in Example 44.

The results obtained are shown in Table 3 below.

TABLE 3

| | First Stage | | | Second Stage | | | Yield Kp·MI pp/ g-Ti | Izod Impact Strength g/10 min | Modulus Kg· cm/cm | Physical properties | | Amount of Fine Powder having a particle of size of 100 μm or less wt % |
|---|---|---|---|---|---|---|---|---|---|---|---|---|
| | $[\eta]$ dl/g | I.I. wt % | Amount of polymerization wt % | $[\eta]$ dl/g | Ethylene content wt % | Amount of polymerization wt % | | | | Flowa-in tension Kg/cm$^2$ | Powder bility g/sec | |
| Ex. 38 | 1.8 | 97.2 | 68 | 3.7 | 45 | 32 | 593 | 2.4 | 13.9 | 12200 | 29 | 0.1 |
| Ex. 39 | 2.0 | 97.4 | 83 | 3.1 | 64 | 17 | 533 | 2.7 | 6.7 | 13600 | 38 | 0.2 |
| Ex. 40 | 2.7 | 97.7 | 57 | 4.2 | 29 | 43 | 621 | 0.8 | 85 | 11300 | 21 | 0.1 |
| Ex. 41 | 1.3 | 97.0 | 90 | 6.3 | 56 | 10 | 477 | 12 | 4.6 | 15700 | 51 | 0.3 |
| Ex. 42 | 1.5 | 97.0 | 82 | 1.8 | 47 | 18 | 520 | 13 | 3.8 | 14900 | 36 | 0.2 |
| C. Ex. 18 | 2.0 | 97.2 | 84 | 3.6 | 89 | 16 | 542 | 2.6 | 2.9 | 13700 | 37 | 0.2 |
| C. Ex. 19 | 1.4 | 97.1 | 88 | 4.7 | 16 | 12 | 471 | 12 | 2.3 | 13800 | 45 | 0.3 |
| Ex. 43 | 1.8 | 97.3 | 77 | 4.6 | 53 | 23 | 632 | 2.5 | 7.4 | 12900 | 33 | 0.2 |
| Ex. 44 | 1.5 | 97.1 | 83 | 4.1 | 42 | 17 | 307 | 5.2 | 5.1 | 14100 | 39 | 0.1 |
| C. Ex. 20 | 1.8 | 95.1 | 70 | 3.9 | 46 | 30 | 419 | 2.2 | 12.7 | 10300 | 7 | 14.0 |
| C. Ex. 21 | 1.5 | 94.6 | 81 | 4.3 | 38 | 19 | 196 | 4.7 | 4.9 | 12800 | 18 | 15.1 | of n-heptane, 15 mmol of triethylaluminium, 0.6 mmol of diphenyldimethoxysilane, and 0.06 mmol Ti of the solid catalyst component prepared in Example 38 (1). The first stage polymerization reaction was carried out with maintaining the temperature of the liquid phase at 70° C., and using hydrogen metered to such an amount that the resulting polypropylene had a predetermined intrinsic viscosity number and propylene in such an amount that the reaction pressure was 9 Kg/cm$^2$ were continuously supplied to the autoclave, the reaction being continued for 2 hours with stirring.

After completion of polymerization reaction, unused propylene were removed, and the temperature of the liquid phase was decreased to 60° C. The second stage polymerization reaction was carried out for 2 hours with stirring while maintaining the temperature at 60° C. and supplying metered propylene-ethylene mixed gas and hydrogen for 2 hours. After completion of polymerization reaction, unused gases were removed and catalyst was inactivated by the addition of small amount of butanol, and the reaction product was separated and dried to obtain of white powder of polypropylene-ethylene block copolymer.

The results obtained are shown in Table 3 hereinbelow.

COMPARATIVE EXAMPLE 20

In a 0.5 l glass reactor was placed 6.0 g of magnesium diethoxide ground using a ball mill. Then, 50 ml of n-heptane and 10 mmol of n-butyl benzoate were added thereto with adding portionwise 43 g of titanium tetrachloride. The resulting mixture was stirred under reflux for 1 hour. Thereafter, the supernatant was removed by decantation, and the solid component thus obtained was well washed with hot n-heptane to obtain a solid catalyst component. This catalyst contained 2.5% by weight of Ti.

As will be apparent from the results in Examples 38~44 and Comparative Examples 18~21, two-stage polymerization of propylene in the presence of the catalyst according to the present invention has various advantages (a) A step of removing catalyst residue from the resulting polypropylene was abridged.

(b) Polypropylenes having excellent, well balanced mechanical strengths such as stiffness, impact strength, etc. can be obtained. The polypropylenes produced can be used as a molding material for producing molded articles which are used in the field of domestic appliances, automobiles, etc.

(c) Polypropylenes whose powder has excellent flow behavior and narrow distribution of particle size can be obtained.

(d) Stabilized polymerization reaction can be carried out.

EXAMPLES 45 AND 46

In a 5 l autoclave which had been purged with nitrogen gas sufficiently was charged 20 g of dried polypropylene powder, and then 7.5 mmol of triethylaluminium, 0.3 mmol of diphenyl-dimethoxysilane and the solid catalyst component prepared in Example 38 (1) in an amount of 0.03 mmol Ti were added thereto. After introducing propylene, ethylene and hydrogen, the temperature and pressure were raised to 60° C. and 25 Kg/cm$^2$ respectively, and polymerization of propylene was carried out under these conditions for 2 hours. Thereafter, unused gases were evacuated. As a result, propylene-ethylene random copolymer was obtained.

The results obtained are shown in Table 4 hereinbelow.

The powder flowability, amount of fine powders and heat temperature were determined as follows.

Powder Flowability

In a cone having an inner diameter of 20 mm at outlet was charged 100 g of a copolymer powder and the amount of the powder which fell in unit hour was determined. The greater value indicates more improved flowability.

Heat Sealing Property

Using a film forming machine having a screw diameter of 20 mm$\phi$, films of 30 $\mu$m thick were produced from a propylene copolymer.

The films were pressed onto each other for 2 seconds under a load of 2 Kg/cm$^2$ using a heat sealer. The thus-obtained sample was cut to strips of 25 mm wide. The samples were stripped at a stripping speed of 200 mm/min. and a stripping angle of 180°. The temperature at which resisitance to stripping was 300 g/25 mm was defined as a heat seal temperature.

EXAMPLE 47

(1) Preparation of Solid Catalyst Component

TO 20.0 g of the same solid component as that obtained in Example 45 (1) was added 120 ml of kerosene oil solution containing dried magnesium sterate (40 mmol), diethoxy-magnesium (60 mmol) and tetra-n-butoxytitanium (60 mmol), and the mixture was allowed to stand at a temperature of 150° C. for 1 hour. Thereafter, 150 ml of isopropanol was added portionwise, followed by stirring at 80° C. for 1 hour. Decantation with 100 ml of n-heptane was repeated 5 times and the residue was dried under reduced pressure at 80° C. to obtain a white catalyst carrier. the catalyst carrier contained 3.4% by weight of magnesium atom. magnesium atom.

Thus-obtained catalyst carrier (10.0 g) was charged in a 0.5 l of glass reactor, and 50 ml of n-heptane, 1.7 mmol of diisobutyl phthalate, and 50 g of titanium tetrachloride. The resulting mixture was stirred for 2 hours at 90° C. Then, the supernatant was removed by decantation and the solid portion was well washed with hot n-heptane to obtain a solid catalyst component, which contained 2.1% by weight of Ti.

(2) Polymerization

The same procedures as in Example 45 were repeated using this solid catalyst.

The results obtained are shown in Table 4.

EXAMPLES 48 AND 49

The same procedures as in Example 45 were repeated using the solid catalyst component prepared in Example 45 except that propylene, ethylene and buthene-1 were introduced in the autoclave instead of propylene and ethylene to obtain a propylen-ethylene-butene-1 random copolymer.

The results obtained are shown in Table 4 hereinbelow.

EXAMPLE 50

The same procedures as in Example 45 were repeated using the solid catalyst component prepared in Example 47 except that propylene, ethylene and buthene-1 were introduced in the autoclave instead of propylene and ethylene to obtain a propylen-ethylene-butene-1 random copolymer.

The results obtained are shown in Table 4 hereinbelow.

COMPARATIVE EXAMPLE 22

In a 0.5 l glass reactor was placed 6.0 g of magnesium diethoxide ground using a ball mill. Then, 50 ml of n-heptane and 10 mmol of n-butyl benzoate were added thereto with adding portionwise 43 g of titanium tetrachloride. The resulting mixture was stirred under reflux for 1 hour. Thereafter, the supernatant was removed by decantation, and the solid component thus obtained was well washed with hot n-heptane to obtain a solid catalyst component. This catalyst contained 2.5% by weight of Ti.

In the same manner as in Example 45 (2), vapor phase polymerization was carried out using the catalyst thus-obtained.

The results obtained are shown in Table 4 hereinbelow.

COMPARATIVE EXAMPLE 23

The same procedures as in Example 48 (2) using the same solid catalyst component as that in Comparative Example 22 to carry a vapor polymerization.

The results obtained are shown in Table 4.

EXAMPLE 52

In a 10 l polymerization reactor provided with a stirrer which had been purged with nitrogen gas sufficiently were charged 5 l of n-heptane, 15 mmol of triethylaluminium, 0.6 mmol of diphenyl-dimethoxysilane, and 0.06 mmol Ti of the solid catalyst component prepared in Example 45 (1). Propylene, ethylene and hydrogen were charged and a slurry polymerization reaction was carried out at 60° C. and at a reaction pressure of 9 Kg/cm$^2$ for 2 hours. After completion of polymerization reaction, unused gases were removed, and the catalyst was inactivated and removed, followed by drying. As a result, white powder of propyleneethylene random copolymer was obtained.

COMPARATIVE EXAMPLE 24

The same slurry polymerization reaction was carried out as in Example 53 using the same solid catalyst comoponent as that used in Comparative Example 22.

The results obtained are shown in Table 4 below.

TABLE 4

|  | Ethylene Content wt % | Butene-1 Content wt % | Yield Kg/g-Ti | Amount of Soluble Polymer Produced wt % | Powder Flowability g/sec | Amount of Fine Powders wt % | Heat Sealing Temperature °C. |
| --- | --- | --- | --- | --- | --- | --- | --- |
| Ex. 45 | 3.2 | 0 | 229 | — | 37 | 0.4 | 138.5 |
| Ex. 46 | 5.1 | 0 | 225 | — | 29 | 0.3 | 130.7 |
| Ex. 47 | 2.8 | 0 | 233 | — | 40 | 0.3 | 139.6 |
| Ex. 48 | 2.9 | 4.5 | 277 | — | 25 | 0.2 | 127.0 |
| Ex. 49 | 1.7 | 2.5 | 238 | — | 32 | 0.3 | 132.5 |
| Ex. 50 | 2.1 | 6.4 | 281 | — | 24 | 0.2 | 123.8 |
| C. Ex. 22 | 3.4 | 0 | 167 | — | 8 | 19.1 | 139.4 |

TABLE 4-continued

|  | Ethylene Content wt % | Butene-1 Content wt % | Yield Kg/g-Ti | Amount of Soluble Polymer Produced wt % | Powder Flowability g/sec | Amount of Fine Powders wt % | Heat Sealing Temperature °C. |
|---|---|---|---|---|---|---|---|
| C. Ex. 23 | 2.0 | 3.7 | 172 | — | 6 | 19.8 | 129.0 |
| Ex. 51 | 3.0 | 0 | 135 | 1.9 | 48 | 0.5 | 139.5 |
| C. Ex. 24 | 2.8 | 0 | 92 | 5.2 | 22 | 20.3 | 140.7 |

From the results in Examples 45~51 and Comparative Examples 22~24, it is apparent that propylene copolymers produced by polymerizing propylene and an α-olefin other than propylene in the presence of the catalyst according to the present invention such that the content of the other α-olefin as a monomer unit is from 0.5 to 20% by weight, the polymer is advantageous in that it can be formed into films, sheets, etc. having an excellent low temperature heat sealing property as well as the above-described benefits.

EXAMPLE 52

Polymerization of Butene-1

In a 5 l autoclave which had been purged with nitrogen gas sufficiently was charged 20 g of dried polypropylene powder, and then 7.5 mmol of triethylaluminium, 0.3 mmol of diphenyl-dimethoxysilane and 0.03 mmol Ti of the solid catalyst component prepared in Example 38 (1) were added thereto. After introducing nitrogen to a level of 2 Kg/cm$^2$, butene-1 was introduced, and the temperature and pressure were raised to 60° C. and 6 Kg/cm$^2$, respectively. Thereafter, 900 ml of hydrogen was introduced. While maintaining the total pressure at 6 Kg/cm$^2$, homopolymerization of butene-1 was carried out for 4 hours.

After completion of polymerization. Thereafter, unused gases were evacuated. As a result, 328 g of butene-1 polymer was obtained.

The viscosity [η](tetralin solution, 135° C.), bulk density, E.I.P. (insoluble fraction after 6 hour extraction with boiling diethyl ether using a Soxley extractor), amount of fine powders, and the content of chlorine in the butene-1 polymer were determined. The results obtained are shown in Table 5.

EXAMPLE 53

(1) Preparation of Solid Catalyst Component

TO 20.0 g of the same solid component as that obtained in Example 52 (1) was added 100 ml of kerosene oil solution containing dried magnesium stearate (40 mmol), diethoxy-magnesium (40 mmol) and tetra-n-butoxytitanium (60 mmol), and the mixture was allowed to stand at a temperature of 150° C. for 1 hour. Thereafter, 100 ml of isopropanol was added portionwise, followed by stirring at 80° C. for 1 hour. Decantation with 100 ml of n-heptane was repeated 5 times and the residue was dried under reduced pressure at 80° C. for 1 hour to obtain a white catalyst carrier. The catalyst carrier contained 3.5% by weight of magnesium atom.

Thus-obtained catalyst carrier (11.0 g) was charged in a 0.5 l of glass reactor, and 50 ml of n-heptane, 3.2 mmol of diisobutyl phthalate, and 50 g of titanium tetrachloride. The resulting mixture was stirred for 1 hour under reflux. Then, the supernatant was removed by decantation and the solid portion was well washed with hot n-heptane to obtain a solid catalyst component, which contained 2.3% by weight of Ti.

(2) Polymerization of Butene-1

The same procedures as in Example 52 were repeated using this solid catalyst.

The results obtained are shown in Table 5.

EXAMPLE 54

The type of polymerization reaction used in this example was a slurry polymerization method.

In a 1 l autoclave which had been purged with nitrogen gas sufficiently and maintained at 10° C., were charged 350 g of liquid butene-1 and then 3 ml of hexane having suspended therein 3.0 mmol of triethylaluminium, 0.15 mmol of phenyltriethoxysilane, and 0.01 mmol Ti of the solid catalyst component in Example 52 (1). After the temperature was raised to 28° C., 50 mR of hydrogen was added. After polymerization was carried out for 4 hours at 28° C., the content was discharged through a valve at the bottom of the reactor of and unused butene-1 was removed. Thus, 44 g of white powdery butene-1 polymer was obtained.

The results obtained are shown in Table 5 hereinbelow.

COMPARATIVE EXAMPLE 25

(1) Preparation of Solid Catalyst Component

In a 0.5 l glass reactor was charged 6.0 g of magnesium diethoxide ground using a ball mill, and 50 ml of n-heptane and 10 mmol of n-butyl benzoate, with further adding potionwise 43 g of titanium tetrachloride. The resulting mixture was stirred for 1 hour under reflux. Thereafter, the supernatant was removed by decantation, and the solid component thus obtained was well washed with hot n-heptane to obtain a solid catalyst component. This catalyst contained 2.5% by weight of Ti.

(2) Polymerization of Butene-1

The same manner as in Example 52 (2), a vapor phase polymerization reaction was carried out using this solid catalyst component.

The results obtained are shown in Table 5 below.

COMPARATIVE EXAMPLE 26

In the same manner as in Example 54, a slurry polymerization reaction was carried out using the same solid catalyst composition as in Comparative Example 25.

COMPARATIVE EXAMPLE 27

In an autoclave were charged 0.10 g (0.56 mmol Ti) of a high activity titanium trichloride catalyst (a product by Marubeni Survay Go., Ltd., lot No. TPU-18) and 8.5 mmol of ethylaluminium chloride, and homopolymerization of butene-1 was carried out at a polymerization temperature of 35° C. as Example 54.

The results obtained are shown in Table 5 below.

EXAMPLE 55

(1) In the same manner as in Example52, a solid catalyst component was prepared.

(2) Butene-1-Propylene Block Copolymer

In a 5 l autoclave which had been purged with nitrogen gas sufficiently was charged 20 g of dried polypropylene powder, and then 7.5 mmol of triethylaluminium, 0.3 mmol of diphenyl-dimethoxysilane and 0.03 mmol Ti of the solid catalyst component were added thereto. After introducing and then propylene were charged, the temperature and pressure were raised to 50° C. and 5 Kg/cm$^2$, respectively, and polymerization of propylene was carried out under these conditions for 30 minutes (first stage polymerization). As a result of polymerization experiment conducted under the same conditions as above gave 11 g of polypropylene which had an I.I. of 96.8%, [η] (135° C., tetralin solution) of 2.25 dl/g.

After completion of the first stage polymerization, gas in the reactor was evacuated, and then nitrogen gas was introduced to elevate the pressure to 2 Kg/cm$^2$. Then, a mixed gas of butene-1 and propylene, and hydrogen were introduced, and while maintaining the pressure with the mixed gas at a level of 6 Kg/cm$^2$ the second stage polymerization reaction was carried out at 60° C. for 3 hours.

After completion of the second stage polymerization, unused gases were evacuated. As a result, 169 g of polymer was obtained. The propylene content of the copolymer in the second stage determined by $^{13}$C NMR was 1.6% by weight.

The data on the polymer are shown in Table 5 below.

EXAMPLE 56

(1) In the same manner as in Example 52, a solid catalyst component was prepared.

(2) Butene-1-Propylene Block Copolymer

In a 2 l autoclave provided with a stirrer which had been purged with nitrogen gas sufficiently were charged 300 g of propane, 5 mmol of triethylaluminium, 0.3 mmol of diphenyl-dimethoxysilane, and 0.02 mmol Ti of the solid catalyst component prepared in the same manner as in Example 52 (1), and then 10 g of propylene was further added, and the temperature was raised to 40° C.

The first stage polymerization reaction was carried out while maintaining the liquid temperature at 40° C. for 30 minute stirring.

Then, propane and unused propylene were evacuated, and the temperature of the autoclave was lowered to 28° C. Thereafter, 600 g of butene-1 and hydrogen were introduced, and the second stage polymerization was carried out for 3 hours.

After completion of the reaction, the content was taken out from the bottom of the autoclave, and unused butene-1 was removed to obtain white powdery copolymer of butene-1 and propylene. The propylene content in the copolymer determined by $^{13}$C NMR was 4.3% by weight.

From the results in Examples 52~56 and Comparative Examples 25~27, it is apparent that polybutenes or copolymers prepared in the presence of the catalyst according to the present invention from butene-1 or butene-1 and other α-olefin, particularly those copolymers in which the content of butene as a monomer unit is from 60 to 99.5% by weight, are polyolefins suitable for molding material for producing various molded articles such as pipes, films, sheets, etc.

While the invention has been described in detail and with reference to specific embodiments thereof, it will be apparent to one skilled in the art that various changes and modifications can be made therein without departing from the spirit and scope thereof.

What is claimed is:

1. In a method for producing a solid catalyst carrier having a surface hydroxyl group concentration of up to 3 μ mole/m$^2$ which is useful for preparing a catalyst containing (A) a solid catalyst component, (B) an organoaluminum compound and (C) an electron donating compound; which catalyst is useful for polymerizing an α-olefin having three or more carbon atoms for copolymerizing an α-olefin having three or more carbon atoms and ethylene; the improvement comprising:

contacting at least one member selected from the group consisting of oxides of elements belonging to Groups II, III and IV of the periodic table and a composite of inorganic oxides containing at least one such oxide, with at least one silicon halide selected from the group consisting of alkylchlorosilanes having 1-6 carbon atoms and tetrachlorosilane, in a molar ratio of 1-50:1 with respect to said oxides;

contacting the product thereof with an aliphatic monovalent alcohol in a ratio of 1-100:1 with respect to said silicon halide;

separating the resulting solid after said contacting;

contacting the resulting solid with a solution containing a magnesium alkoxide represented by the formula:

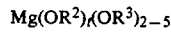

$$Mg(OR^2)_t(OR^3)_{2-5}$$

wherein R$^2$ and R$^3$ are the same or different, and each represents an alkyl group of 1-10 carbon atoms, and t is a real number of 0 to 2, wherein said solution containing a magnesium alkoxide is a mixture thereof with at least one additional member selected from the group consisting of a hydrocarbon, an electron donor and an alkoxytitanium compound; and contacting the product thereof with tetrachlorosilane.

2. The method as claimed in claim 1, wherein said solution containing a magnesium alkoxide is a mixture of an alkoxytitanium compound and a magnesium alkoxide.

* * * * *

TABLE 5

| | Polymerization Activity Kg/g-Ti | [η] dl/g | Bulk Density g/cc | E.I.P. % | Amount of Fine Powder wt % | Amount of Chlorine ppm |
| --- | --- | --- | --- | --- | --- | --- |
| Ex. 52 | 114 | 1.9 | 0.37 | 97.2 | 0.4 | 36 |
| Ex. 53 | 101 | 1.9 | 0.37 | 96.9 | 0.5 | 36 |
| Ex. 54 | 92 | 2.0 | 0.38 | 97.5 | 0.2 | 50 |
| C. Ex. 25 | 42 | 1.8 | 0.27 | 94.2 | 11.2 | 536 |
| C. Ex. 26 | 36 | 1.8 | 0.29 | 93.8 | 8.5 | 588 |
| C. Ex. 27 | 1.6 | 2.6 | 0.44 | 97.1 | 0.2 | 3900 |
| Ex. 55 | 118 | 1.9 | 0.35 | 97.5 | 0.3 | 32 |
| Ex. 56 | 94 | 2.0 | 0.36 | 97.8 | 0.1 | 46 |